(12) United States Patent
Cheng et al.

(10) Patent No.: US 9,910,241 B2
(45) Date of Patent: Mar. 6, 2018

(54) LENS MOVING APPARATUS

(71) Applicant: Hong Kong Applied Science and Technology Research Institute Co. Ltd., Shatin (HK)

(72) Inventors: Kowk Sing Cheng, New Territories (HK); Kin Ming Fan, New Territories (HK); Chuen Kuen Yeung, New Territories (HK)

(73) Assignee: Hong Kong Applied Science & Technology Research Institute Co., Ltd., Shatin (HK)

( * ) Notice: Subject to any disclaimer, the term of this patent is extended or adjusted under 35 U.S.C. 154(b) by 111 days.

(21) Appl. No.: 14/883,456

(22) Filed: Oct. 14, 2015

(65) Prior Publication Data

US 2016/0048002 A1    Feb. 18, 2016

Related U.S. Application Data

(63) Continuation-in-part of application No. 14/038,380, filed on Sep. 26, 2013.

(60) Provisional application No. 61/814,121, filed on Apr. 19, 2013.

(51) Int. Cl.

| G02B 27/64 | (2006.01) |
| G02B 7/08 | (2006.01) |
| G02B 7/09 | (2006.01) |

(52) U.S. Cl.
CPC ............... *G02B 7/08* (2013.01); *G02B 7/09* (2013.01); *G02B 27/646* (2013.01)

(58) Field of Classification Search
CPC ......... G02B 27/64–27/648; G02B 7/04; G02B 7/08–7/105; G03B 5/00–5/08; G03B 2205/00–2205/0092; H04N 5/232–5/23296

USPC .................. 359/554–557; 396/52–55, 73, 75
See application file for complete search history.

(56) References Cited

U.S. PATENT DOCUMENTS

| 7,725,014 | B2 | 5/2010 | Lam et al. |
| 8,224,169 | B2 | 7/2012 | Tsuruta et al. |
| 8,670,195 | B2 | 3/2014 | Ikushima et al. |
| 2011/0001836 | A1* | 1/2011 | Chiang ............... G02B 27/646 348/208.99 |
| 2011/0096178 | A1* | 4/2011 | Ryu ..................... H04N 5/2252 348/208.2 |
| 2011/0097062 | A1 | 4/2011 | Tsuruta et al. |
| 2011/0286099 | A1 | 11/2011 | Shiraki et al. |

(Continued)

FOREIGN PATENT DOCUMENTS

| CN | 101685235 A | 3/2010 |
| CN | 103454750 | 12/2013 |
| JP | 2011085666 A | 4/2011 |
| KR | 20120097117 A | 9/2012 |

OTHER PUBLICATIONS

Response to Final Action as Filed, U.S. Appl. No. 14/038,380, filed Sep. 26, 2013, Response Filed Aug. 23, 2016, 15 Pages.

(Continued)

*Primary Examiner* — Bumsuk Won
*Assistant Examiner* — Jeffrey Madonna
(74) *Attorney, Agent, or Firm* — Norton Rose Fulbright US LLP

(57) ABSTRACT

The subject matter disclosed herein relates to an imaging module comprising an electromagnetic actuator to provide focus-related and image stabilization-related functionality.

9 Claims, 14 Drawing Sheets

(56) References Cited

U.S. PATENT DOCUMENTS

| | | | | |
|---|---|---|---|---|
| 2012/0229901 | A1* | 9/2012 | Moriya | G03B 3/10 359/557 |
| 2012/0287517 | A1* | 11/2012 | Terajima | H02K 41/0356 359/824 |
| 2012/0314307 | A1* | 12/2012 | Ikushima | G02B 27/646 359/814 |
| 2012/0314308 | A1 | 12/2012 | Ikushima et al. | |
| 2013/0089311 | A1 | 4/2013 | Jung et al. | |
| 2013/0163085 | A1* | 6/2013 | Lim | H02K 41/0356 359/557 |
| 2013/0170052 | A1 | 7/2013 | Yu | |
| 2014/0072289 | A1 | 3/2014 | Lim | |
| 2014/0355118 | A1* | 12/2014 | Park | G02B 27/646 359/557 |

OTHER PUBLICATIONS

Advisory Action, U.S. Appl. No. 14/038,380, filed Sep. 26, 2013, dated Oct. 5, 2016, 5 Pages.

Request for Continued Examination (RCE) as Filed, U.S. Appl. No. 14/038,380, filed Sep. 26, 2013, RCE filed Oct. 17, 2016, 16 Pages.

Non-Final Office Action, dated Dec. 13, 2016, U.S. Appl. No. 14/038,380, 14 pgs.

PCT/CN2014/075703 / 201410278JYC: Application as filed Apr. 19, 2013, 30 pages.

PCT/CN2014/075703 / 201410278JYC: International search report and written opinion, dated Jul. 1, 2014, 18 pages.

PCT/CN2014/075703 / 201410278JYC: Initial Publication, Oct. 23, 2014, 32 pages.

PCT/CN2014/075703 / 201410278JYC: International Report on Patentability, dated Oct. 20, 2015, 8 pages.

U.S. Appl. No. 14/038,380, filed Sep. 26, 2013, 40 pages.

U.S. Appl. No. 14/038,380: Filing Receipt, Oct. 18, 2013, 3 pages.

U.S. Appl. No. 14/038,380: Notice of Publication, dated Sep. 26, 2013, 1 page.

U.S. Appl. No. 14/038,380: Non-Final Rejection, dated Dec. 2, 2015, 14 pages.

U.S. Appl. No. 14/038,380: Amendment/Req Reconsideration—After Non-Final Rejection, dated Mar. 2, 2016, 16 pages.

U.S. Appl. No. 14/038,380: Final Rejection, dated Jun. 20, 2016, 18 pages.

* cited by examiner

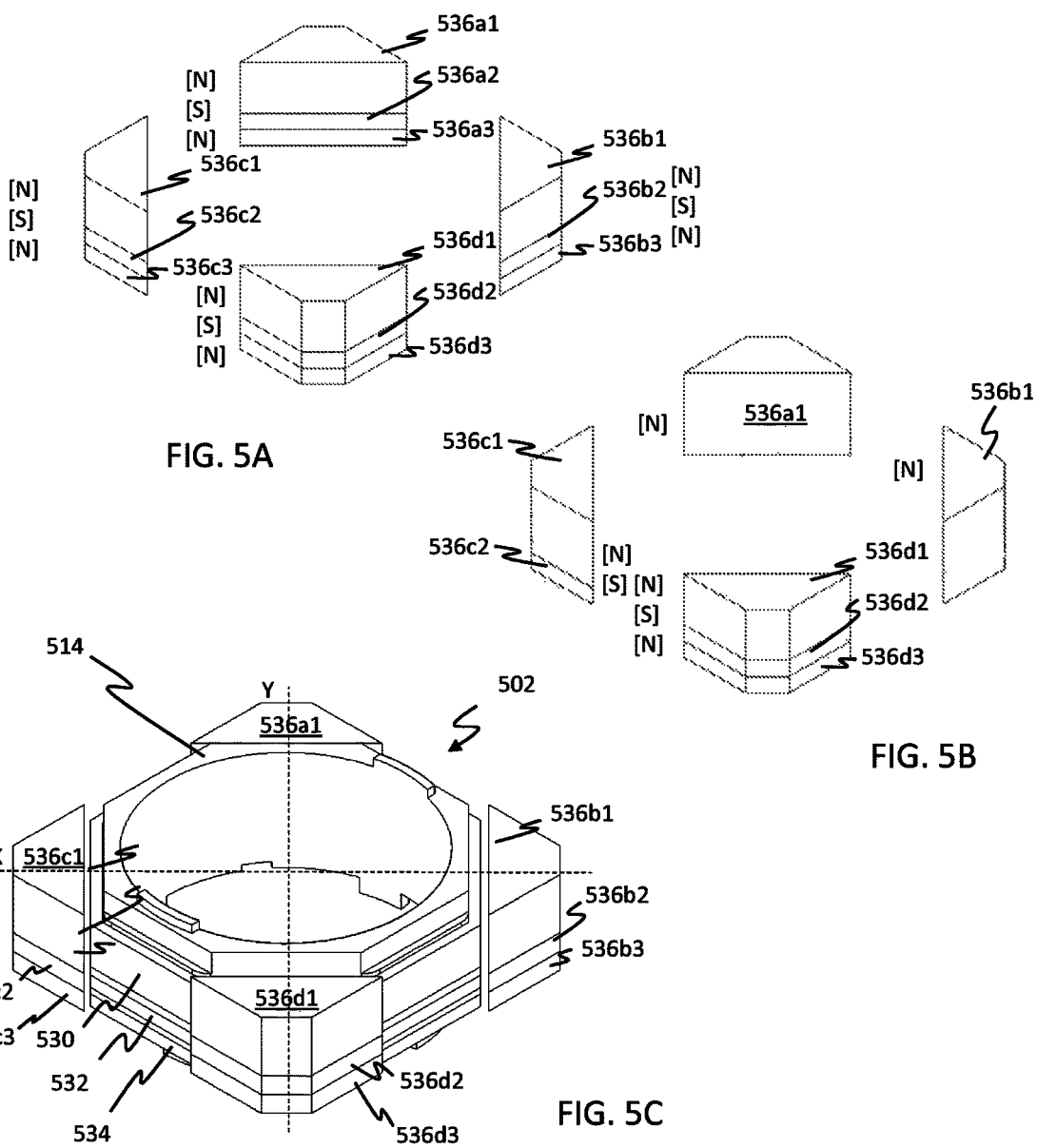

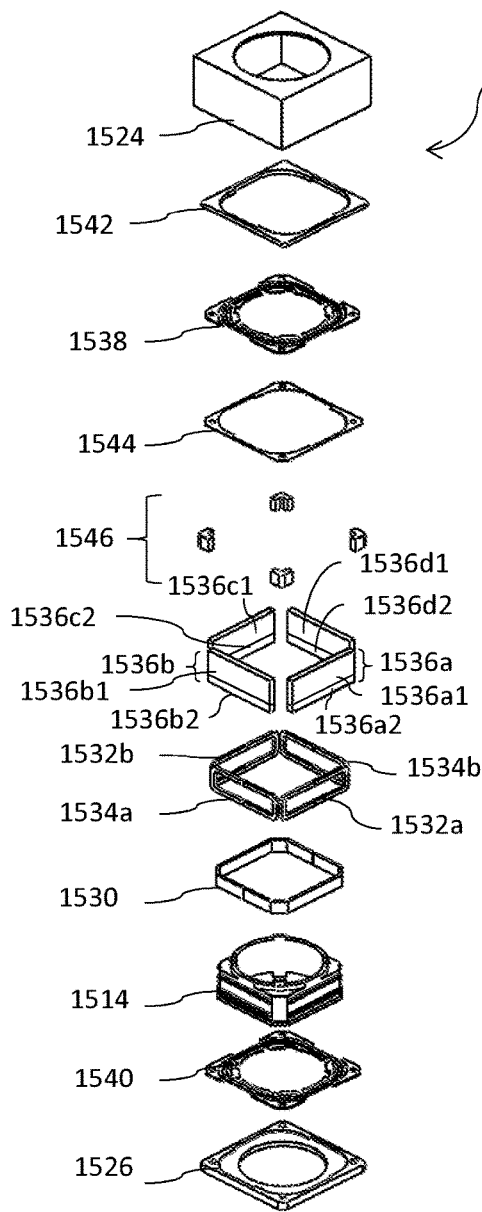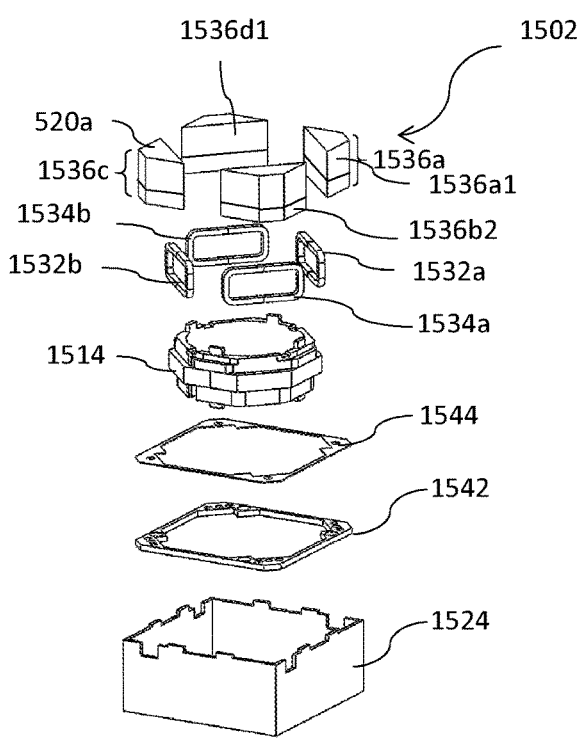
FIG. 15A
FIG. 15B

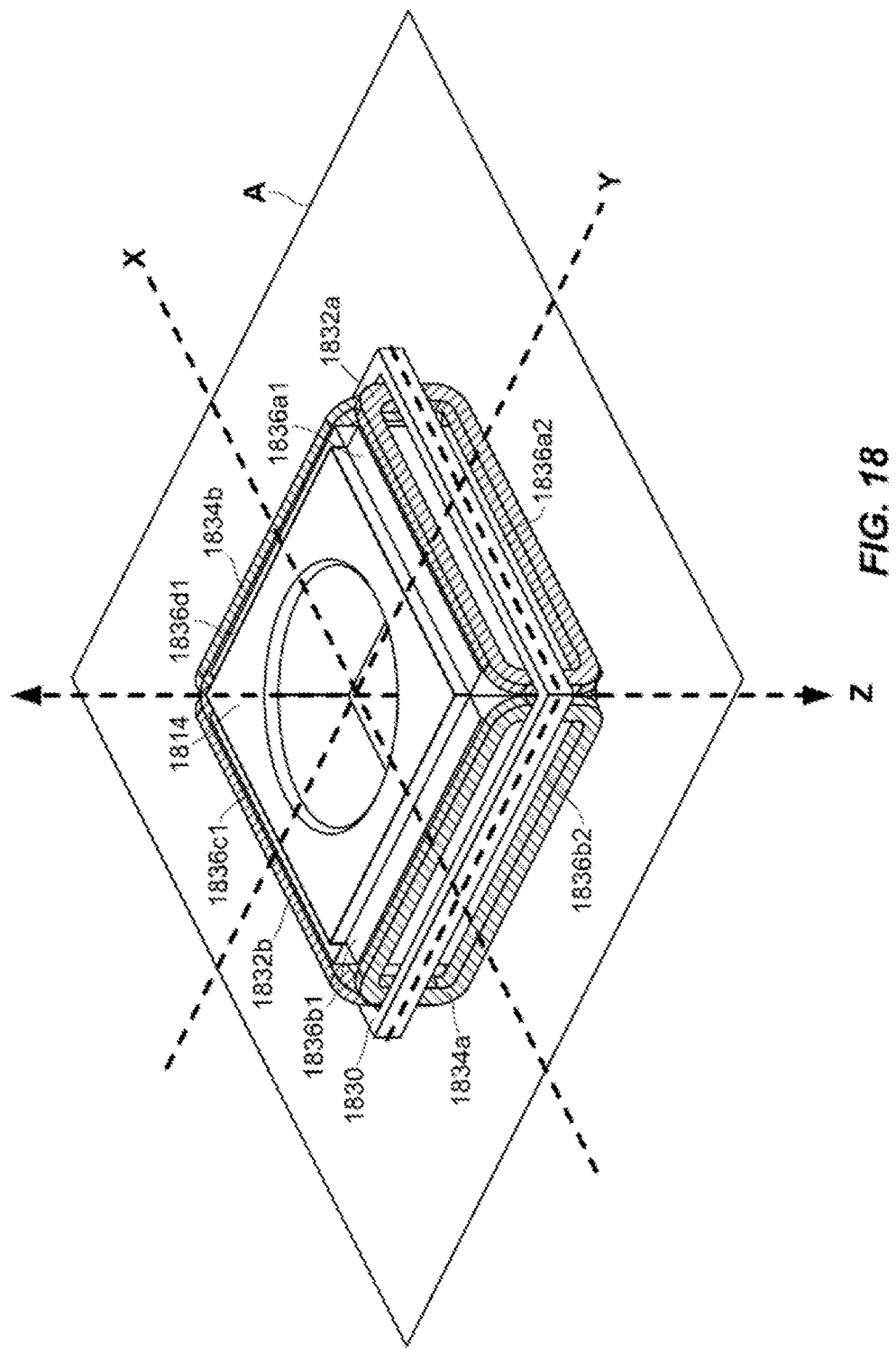

LENS MOVING APPARATUS

CROSS REFERENCE TO RELATED APPLICATIONS

The present application is related to, and claims priority from, U.S. Non-Provisional patent application Ser. No. 14/038,380, filed on Sep. 26, 2013, and titled NOVEL LENS MOVING APPARATUS, and U.S. Provisional Pat. Appl. No. 61/814,121, filed on Apr. 19, 2013, and titled NOVEL LENS MOVING APPARATUS.

FIELD

The subject matter disclosed herein relates to an imaging module capable of having at least one lens assembly and comprising an electromagnetic actuator to adjust a focus of the imaging module and/or perform image stabilization.

BACKGROUND

Many portable electronic apparatuses, including but not limited to handheld devices such as cellular phones, tablets, and/or a personal digital assistant (PDA) for example, may comprise a compact camera or imaging module. Such a module may comprise an image sensor, an imaging lens assembly, and/or an actuator to adjust the position of the imaging lens assembly with respect to the image sensor and/or provide image stabilization. As designers push towards slimmer, smaller, and/or lighter portable electronic apparatuses, compact camera module manufacturers, among others, are facing a challenge of providing smaller compact camera modules that can be manufactured with reduced cost by reducing manufacturing tolerances of an optical system of the camera modules.

BRIEF DESCRIPTION OF THE DRAWINGS

Non-limiting and non-exhaustive embodiments will be described with reference to the following objects, wherein like reference numerals refer to like parts throughout the various objects unless otherwise specified.

FIGS. 5A-5C illustrate different portions of an imaging module. FIG. 5A illustrates an arrangement of a plurality of magnets according to one embodiment. FIG. 5B illustrates an arrangement of a plurality of magnets according to another embodiment. FIG. 5C is a perspective view of an imaging module according to one embodiment.

FIG. 7A is a perspective view of a lens holder. FIG. 7B is a side view of a lens holder. FIG. 7C is a perspective view of a plurality of magnets. FIGS. 7D and 7E illustrate a lens holder and a plurality of magnets according to one embodiment.

FIG. 8B is a top-down view of a lens holder according to one embodiment. FIG. 8C is a perspective view of a plurality of magnets according to one embodiment. FIG. 8A is a perspective view of a lens holder and a plurality of magnets according to an embodiment.

FIGS. 15A-15B illustrate portions of different embodiments of an imaging module.

FIG. 18 is a perspective view of an imaging module according to an embodiment.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

As used to describe such embodiments, terms "above", "below", "upper", "lower", "horizontal", "vertical", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to an optical axis while "vertical" may refer to an orientation parallel to the optical axis.

Figure 1:
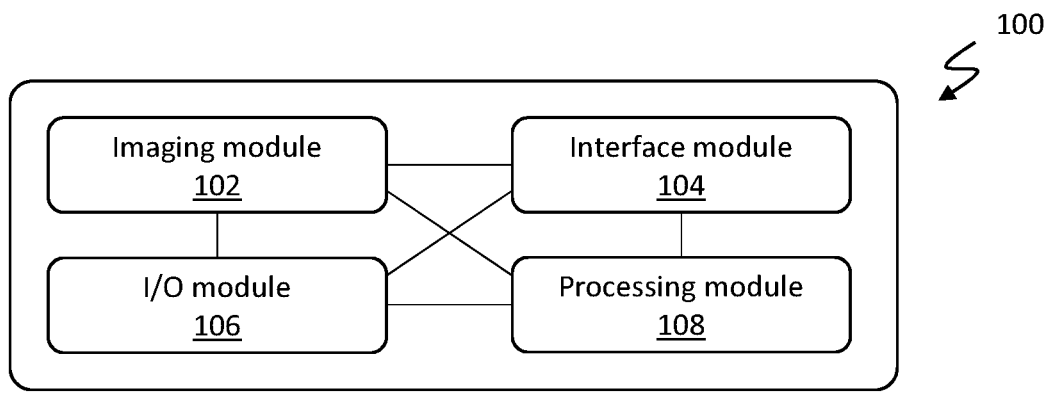
FIG. 1 is a block diagram illustrating a device, according to an embodiment.

Embodiments described herein include an imaging module that provides a mechanism and/or allows a process to adjust a focal ratio between the one or more individual lens assemblies and one or more image sensors, and/or facilitate image stabilization. FIG. 1 is a block diagram illustrating a device 100 according to one embodiment. Device 100 may comprise any kind or form of device, including, for example, electronic devices such as handheld devices like phones, tablets, and PDAs, cameras, computers, among other things. Device 100 may comprise a plurality of modules related to the operation and/or function thereof. The plurality of modules may comprise hardware, software, and/or a combination thereof. In one embodiment, device 100 may comprise an imaging module 102, an interface module 104, an I/O module 106, and a processing module 108, among other things. Imaging module 102, interface module 104, I/O module 106, and processing module 108 may be communicably coupled together so as to facilitate the transmission and reception of data to and from any one given module.

Imaging module 102 may comprise any suitable module related to imaging. For instance, imaging module 102 may comprise a combination of hardware and/or software in order to facilitate the capture of images of a given scene. For instance, in one embodiment, imaging module 102 may be a component of a camera module of a handheld device.

Interface module 104 may comprise any suitable module relating to an interface with users, devices, and/or other modules of device 100. For instance, interface module 104 may comprise a combination of hardware and/or software capable of facilitating an interface to allow interaction with a user. In one embodiment, interface module 104 may transmit and receive data related to a graphical user interface with which a user may interact. In another embodiment, interface module 104 may facilitate communication with a device external to device 100. For instance, interface module 104 may transmit and/or receive communications related to a device external to device 100.

I/O module 106 may comprise any suitable module relating to the input/output of a device. For instance, I/O module 106 may comprise a combination of hardware and/or software and facilitate functionality relating to the input and output functionality of device 100.

Processing module 108 may comprise any suitable module related to processing and/or computation of device 100. For instance, in one embodiment, processing module 108 may comprise a processor configured to transmit and receive data and perform different processes related thereto. For instance, processing module 108 may be capable of receiving instructions related to functionality of a module of device 100 and may facilitate the implementation thereof.

In operation, according to one embodiment of device 100, imaging module 102, interface module 104, I/O module 106, and processing module 108 may exchange data as part of the operation of device 100. For instance, a user may attempt to interact with an element of device 100. The user interaction may be represented by a signal. In one embodiment, the signal may originate in I/O module 106. An additional signal related to instructions may be transmitted to processing module 108. In one example, the user interaction may be related to the operation of imaging module 102, such as instructing that imaging module 102 be initialized in preparation of capturing an image. Imaging module 102 may capture an image and may transmit a plurality of signals relating to the same to processing module 108, I/O module 106, and/or interface module 104, among other things. In one example embodiment, the signals related to the captured image may be stored in a memory of device 100 that may comprise a non-transitory computer readable storage medium. The foregoing presents an exemplary description of one possible operation of device 100 and is not to be taken in a restrictive sense.

Figure 2:
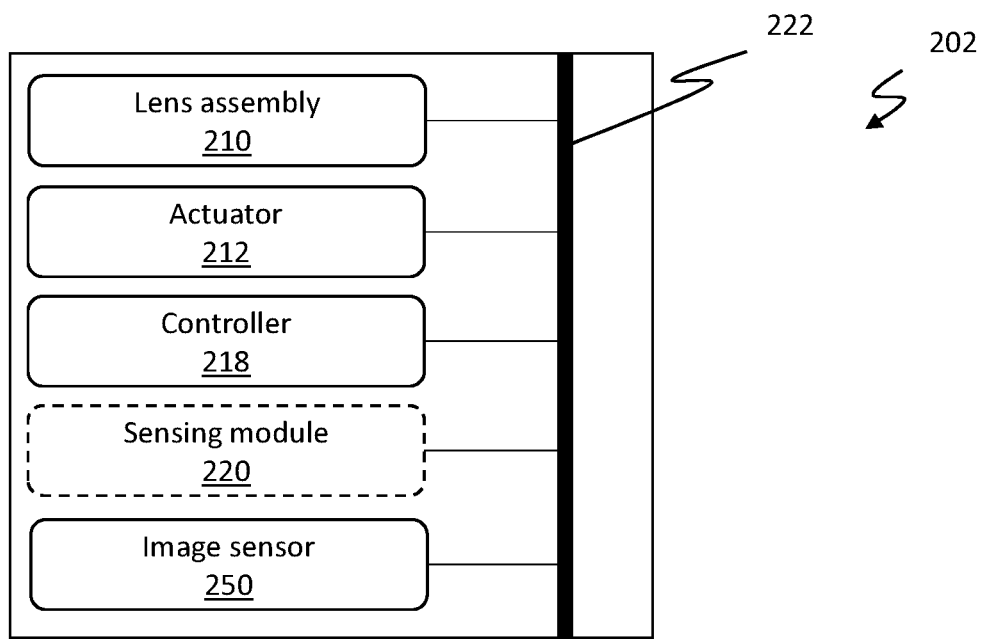
FIG. 2 is a block diagram illustrating an imaging module, according to an embodiment.

FIG. 2 is a block diagram of imaging module 202 according to one embodiment. FIG. 2 illustrates the communicative coupling of different parts of imaging module 202 and is not intended to be interpreted as a literal description of the physical structure of imaging module 202. In this example, imaging module 202 may comprise a combination of hardware and software including, but not limited to, a lens assembly 210, an actuator 212, a controller 218, sensing module 220, and image sensor 250. Imaging module 202 may comprise a bus 222 configured to facilitate the transmission and reception of data between modules of imaging module 202 and/or external modules and devices, among other things. These and other modules that may make up imaging module 202 may comprise any combination of hardware, software, and/or combination thereof.

Lens assembly 210 may comprise a combination of structure, such as glass, plastic, and/or metal, among other things, in order to form an element configured to receive and transmit electromagnetic radiation that, in at least one embodiment, may comprise visible light. Of course, lens assembly 210 may comprise other structures and functionality. In one embodiment, lens assembly 210 may comprise one or more lens elements (not shown) that may operate in concert to refract light. Imaging module 202 may comprise a plurality of lens assemblies 210 in certain embodiments.

Actuator 212 may comprise any suitable form of actuator capable of moving lens assembly 210 relative to image sensor 250, or vice versa. In one embodiment, actuator 212 may comprise an electromagnetic actuator comprising at least one magnet and at least one coil that may interact with each other via, among other things, electromagnetic forces. The electromagnetic actuator may be capable of inducing movement of lens assembly 210 in one or more directions and/or inducing rotation of lens assembly 210 about one or more axes. The electromagnetic actuator may comprise a magnet and coil actuator and a voice coil motor (VCM), among other things. Of course, other forms of actuator 212 are contemplated by the present disclosure including, but not limited to electromechanical and piezotube-related actuators.

Controller 218 may comprise hardware, software, and any suitable combination thereof. Controller 218 may comprise a module capable of altering characteristics related to lens assembly 210 including, but not limited to, exposure time, f-stop numbers, focal length and ratios, and lens distortion mapping, among other things. For instance, in one embodiment, controller 218 may be capable of determining a distance to an object, a focal length of a lens, and may facilitate lens height adjustment accordingly. Controller 218 may also be capable of providing movement and rotation control for imaging module 202. For instance, controller 218 may be capable of controlling the tilt of lens assembly 210 about at least two axes. In some examples, controller 218 may be integrated into the same chip as one or more image sensors 250. Of course, the preceding and other functionality contemplated for controller 218 may be performed any element or part, and controller 218 may be considered more generally as a symbolic representation of hardware and software configured to contribute to the operation of imaging module 202.

Optional sensing module 220 may comprise any hardware, software, and any combination thereof capable of sensing a position of a lens assembly 210 relative to, for example, an image sensor 250. In one embodiment, sensing module 220 may comprise an element configured to sense a position of lens assembly 210 based on a strength of a magnetic field, for instance. Alternative embodiments may include sensors configured to sense a current or a resistance, among other things. Of course, any other suitable means or mechanism is contemplated under the present disclosure.

Bus 222 may be capable of transmitting and receiving data to and from lens assembly 210, actuator 212, controller 218, sensing module 220, image sensor 250, and devices and modules external to imaging module 202.

In operation, signals may be received at imaging module 202 via bus 222 and may be directed to the appropriate module. Signals may also be transmitted from imaging module 202 via bus 222. Signals may be received and transmitted among modules of imaging module 202 via bus 222.

Figure 3:
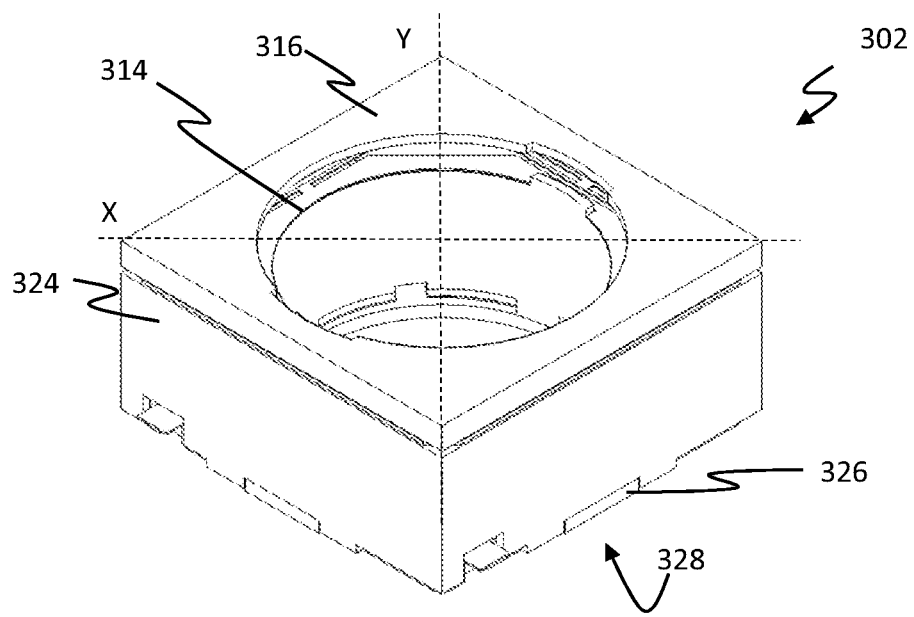
FIG. 3 is a perspective view of an imaging module according to an embodiment.

FIG. 3 is a perspective view of an imaging module 302 according to one embodiment. Imaging module 302 may comprise a lens holder 314 arranged within an upper casing 316 and a yoke 324. Imaging module 302 may comprise a lens assembly (not shown) configured to facilitate the capture of images. The lens assembly may be connected to lens holder 314. In one embodiment, the lens assembly may be integrated into lens holder 314. Lens holder 314 may be connected to a base 326. In one embodiment, a controller 328 may be connected to base 326. In addition to controller 328, an electric circuit and a power source (not shown) may be provided to facilitate actuator control. Imaging module 302 may comprise an image sensor (not shown) configured to collect refracted light, among other things. In one embodiment, the lens holder 314 and the lens assembly may define an optical axis perpendicular to x- and y-axes illustrated in FIG. 3. It is to be understood that the x- and y-axes illustrated in FIG. 3 are included to facilitate understanding of the following discussion, and are not to be understood to be components of the physical structure of imaging module 302.

In operation lens holder 314 may be configured to move along an optical axis defined by a lens assembly of lens holder 314. Movement of the lens holder 314 may be induced by an electromagnetic actuator. For instance, a current signal may lead to one or more electromagnetic forces relative to the electromagnetic actuator, and may induce movement of lens holder 314. In one example, the electromagnetic actuator may comprise one or more magnets connected to yoke 324, and one or more coils connected to lens holder 314. The electromagnetic actuator may be capable of inducing movement of lens holder 314 along at least one axis, and further inducing rotation of lens holder 314 about two or more other axes. For instance, the one or more electromagnetic forces may induce movement of the one or more coils connected to lens holder 314 relative to the one or more magnets. Movement of lens holder 314 may adjust a distance between a lens assembly in lens holder 314 and an image sensor arranged to receive refracted light from the lens assembly. For example, lens holder 314 may move relative to the image sensor to focus light on the image sensor, among other things. Imaging module 302 may also comprise a spring mechanism connected to lens module 314 configured to assist lens holder 314 return back to a resting or neutral position. The spring mechanism may comprise an upper and a lower spring. For example, each of the lower spring and the upper spring may comprise a coil spring, having a diameter larger than the diameter of lens holder 314. The lower spring and the upper spring may also comprise a leaf spring, or one or more leaf springs arranged proximate to the respective ends of lens holder 314. The upper and lower springs may also be positioned in different locations. For example, both may be located proximate to each other at one end of lens holder 314.

Further, lens holder 314 may be capable of rotating about other axes. For example, lens holder 314 may rotate about the y-axis illustrated in FIG. 3 in response to a current signal to an electromagnetic actuator. In another example, lens holder 314 may rotate about the x-axis illustrated in FIG. 3 in response to a current signal to an electromagnetic actuator. In one embodiment, one or more current signals may be sent to an electromagnetic actuator and may induce rotation of lens holder 314 about the x- and/or the y-axis. Rotational movement of lens holder 314 about the x- and/or y-axis may facilitate functionality related to image stabilization, among other things.

Figure 4:
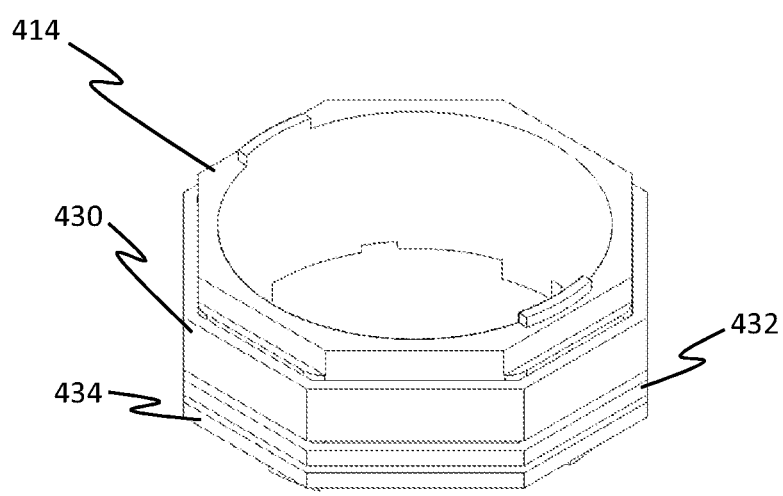
FIG. 4 is a perspective view of a lens holder according to an embodiment.

FIG. 4 is a perspective view of a lens holder 414. Lens holder 414 may be connected to a lens assembly (not shown). FIG. 4 illustrates one embodiment of an electromagnetic actuator comprising a first coil 430, a second coil 432, and a third coil 434. First, second, and third coils 430, 432, and 434 may be connected to an exterior surface of lens holder 414. First, second, and third coils 430, 432, and 434 may be arranged proximate to one or more magnets of the electromagnetic actuator. As used herein, a coil may be proximate to a magnet if each is arranged within an electromagnetic and/or magnetic field of the other. First, second, and third coils 430, 432, and 435 may be arranged concentrically on lens holder 414 such that the center of each of first, second, and third coils 430, 432, and 435 lies on the optical axis of lens holder 414.

In operation, a current signal may be transmitted to first coil 430. The provided current may induce the creation of an electromagnetic field between first coil 430 and one or more magnets of the electromagnetic actuator. The induced electromagnetic field may induce movement of lens holder 414 along an optical axis defined by lens holder 414. A current may be transmitted to second coil 432. The provided current may induce the creation of an electromagnetic field between second coil 432 and one or more magnets of the electromagnetic actuator. The induced electromagnetic field may induce rotation of lens holder 414 about an axis perpendicular to the optical axis. A current may be transmitted to a third coil 434. The provided current may induce the creation of an electromagnetic field between third coil 434 and one or more magnets of the electromagnetic actuator. The induced electromagnetic field may induce rotation of lens holder 414 about an axis perpendicular to the optical axis.

The electromagnetic actuator may comprise portions configured to operate independently and/or may be electrically connected in series, depending on the kind of control that is required. According to one embodiment, for motion control, second coil 432 and third coil 434 may be connected independently such that electric current flowing through second coil 432 may be independent of any current flowing through third coil 434 so as to, among other things, permit independent rotational movement of lens holder 414 around different axes. This independent movement may allow for precise control over different functionality, such as, for example, autofocus functionality and image stabilization functionality, among other things. In one embodiment, the autofocus and image stabilization functionality may operate independently or in combination, as desired. In another embodiment, control of the autofocus functionality and control of the image stabilization functionality may be provided independently, depending on the requirements of the particular application In one embodiment, first, second, and third coils 430, 432, and 435 may comprise electrically conductive material. Certain components of imaging module 302, such as the casing and lens holder 414, may comprise non-magnetic materials such as plastics or non-magnetic metal alloys, so as not to interfere with the magnetic fields of the coils and the magnets, among other things.

FIGS. 5A-5C illustrate different portions and embodiments of an imaging module 502. FIG. 5A illustrates one set of a plurality of magnets of an electromagnetic actuator of imaging module 502. In this embodiment, twelve magnets may be arranged in proximity to one or more coils to facilitate movement and/or rotation of lens holder 514. For example, magnets 536a1, 536b1, 536c1, and 536d1 may be arranged in proximity to first coil 530, magnets 536a2, 536b2, 536c2, and 536d2 may be arranged in proximity to second coil 532, and magnets 536a3, 536b3, 536c3, and 536d3 may be arranged in proximity to a third coil 534. As illustrated in FIG. 5A, a surface of magnets 536a1-3, 536b1-3, 536c1-3, and 536d1-3 may comprise a polarity. As used herein, the polarity of the face of each respective magnet facing coils 530, 532, and/or 534 will be illustrated with either [N] or [S] to indicate either a north or south polarity. Thus, for example, the face of magnets 536a1 facing first coil 530 comprises a polarity 'N'. As one of ordinary skill in the art would appreciate, the polarities listed in FIG. 5A are intended to illustrate operation, but are not to be understood in a restrictive sense. Indeed, any number of polarities and arrangements of magnets and coils is contemplated by the present disclosure.

FIG. 5B illustrates an alternative embodiment of magnets of an electromagnetic actuator of an imaging module 502. This embodiment comprises magnets 536a1, 536b1, 536c1, and 536d1, which may be arranged in proximity to first coil 530; magnets 536c2 and 536d2, which may be arranged in proximity to second coil 532; and a magnet 536d3, which may be arranged in proximity to a third coil.

FIG. 5C illustrates one embodiment of an imaging module 502 wherein the magnets (536a1 to 536d3) are arranged around lens holder 514 and first, second, and third coils 530, 532, and 534. In operation, current may be provided to first coil 530, which may induce the formation of an electromagnetic force between first coil 530 and at least magnets 536a1, 536b1, 536c1, 536d1, which electromagnetic force may induce movement of lens holder 514 along, or parallel to, an optical axis defined by a lens assembly and lens holder 514. For example, the current signal may induce a combination of electromagnetic forces, including, for example, attractive and repulsive forces, of the electromagnetic actuator, which may be sufficient to induce movement of lens holder 514.

A further current may be provided to second coil 532, which may induce the formation of an electromagnetic force between second coil 532 and at least magnets 536a2, 536b2, 536c2, and 536d2. The formed electromagnetic force may induce rotational movement of lens holder 514 about an axis perpendicular or orthogonal to the optical axis. For instance, in one example, the provided current may induce rotation of lens holder 514 such that lens holder 514 tilts about an axis. The current provided to second coil 532 may be independent of any current provided to either first or third coils 530 and 534.

Yet a further current may be provided to third coil 534, which may induce the formation of an electromagnetic force between third coil 534 and at least magnets 536a3, 536b3, 536c3, and 536d3. The formed electromagnetic force may induce rotational movement of lens holder 514 about an axis perpendicular or orthogonal to the optical axis and, in one embodiment, the rotational axis related to second coil 532. The movement and/or rotation of lens holder 514 may correspond to focus and/or image stabilization functionality.

It is to be understood by the foregoing description that each of first, second, and third coils 530, 532, and 534 may receive a current signal that induces rotational movement of lens holder 514 independent of each other coil. For example, in one embodiment, one or more current signals may be transmitted to first coil 530 which may be related to autofocus functionality of imaging module 502. Thus, first coil 530 may be referred to as an autofocus coil. In this example, the current signal to first coil 530 may be independent of any current signals to second and third coils 532 and 534. For instance, first coil 530 may receive a current signal while second and third coils 532 and 534 do not receive any current signals. Additionally, in one embodiment, imaging module 502 supports receiving current signals of different magnitudes and/or polarities at each of first, second, and third coils 530, 532, and 534. For example, it may be desirable to receive a current signal of $A_1$ at first coil 530, while concurrently receiving current signals of $A_2$ at second coil 532 and $A_3$ at third coil 534. Thus, for example, if there is a desire to use autofocus functionality of imaging module 502, a current signal of $A_1$ may be transmitted to first coil 530, which may induce a movement of lens holder 514 along an optical axis of lens holder 514. In one example, there may be a desire to use image stabilization functionality of imaging module 502 concurrently with the use of autofocus functionality thereof, and current signals of $A_2$ and $A_3$ may be transmitted to second and third coils 532 and 534, respectively, which may induce rotation of lens holder 514 about axes perpendicular or orthogonal to the optical axis.

In yet other examples, a plurality of current signals may be transmitted to any one of the first, second, and third coils 530, 532, and 534. For instance, in one embodiment, inducing movement and/or rotation of lens holder 514 may be related to transmitting a first current signal $A_1$ to induce a first force, and subsequently transmitting a second current signal $A_2$ to induce a second force. In fact, any number, magnitude, polarity, and/or duration of current signals are contemplated by the presented disclosure.

In one embodiment, first, second, and/or third coils 530, 532, and 534 may be configured to induce differing electromagnetic fields at different portions of the coil. For instance, second coil 530 may comprise a first and a second portion and be capable of inducing a first electromagnetic field at the first portion in response to a current signal, while inducing a second electromagnetic field at the second portion. In one example implementation, a coil, such as second coil 532 may be capable of receiving a first current on a first portion and a second current on a second portion and thereby induce the creation of two electromagnetic fields. Of course, these are but illustrative examples and are not intended to be understood in a restrictive sense.

Figure 6A:
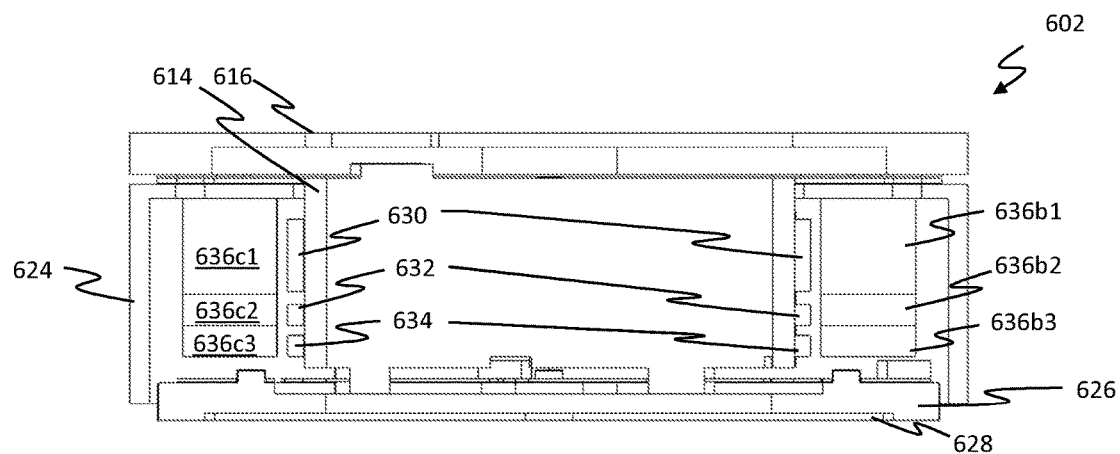
FIGS. 6A-6B are cross sections of an imaging module according to different embodiments.
Figure 6B:
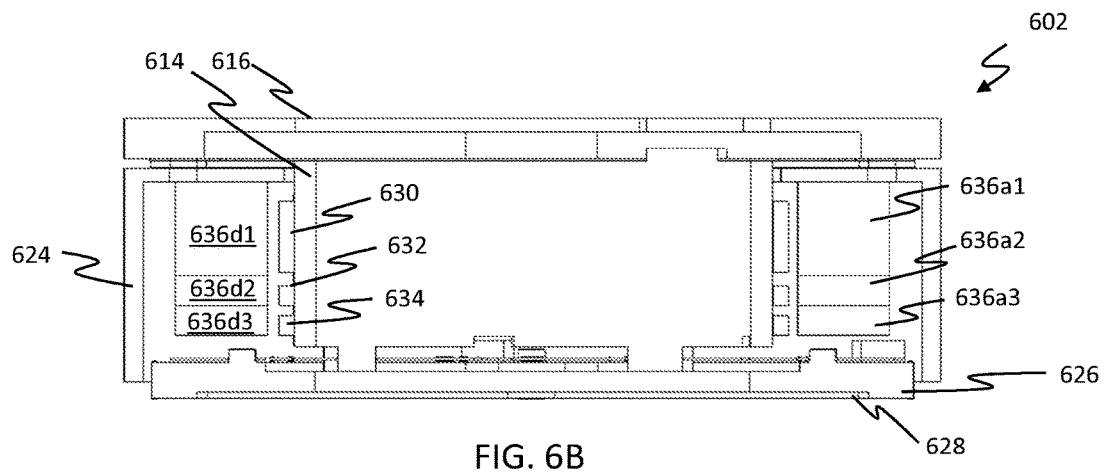

FIGS. 6A and 6B show cross sections of imaging module 602 as may be viewed if the imaging module 302 in FIG. 3 were divided along the x- and y-axes. As illustrated in FIGS. 6A and 6B, imaging module 602 comprises an upper casing 616, a yoke 624, and a base 626. Circuitry, such as, for example, a controller 628, may be integrated into base 626. Upper casing 616, yoke 624, and base 626 may comprise any suitable materials including, but not limited to, plastics and other lightweight synthetic materials.

Lens holder 614 may be arranged within upper casing 616, yoke 624, and base 626 of imaging module 602. In one embodiment, one or more springs (see FIGS. 9A-9C) to assist in providing functionality of imaging module 602. In one embodiment, a plurality of coils such as, for example, first coil 630, second coil 632, and third coil 634 may be attached to lens holder 614. The coils, such as first, second, and third coils 630, 632, and 634 may be arranged in concentric circles around an outer surface of lens holder 614. Alternatively, first, second, and third coils 630, 632, and 634 may be arranged at different positions around the exterior surface of lens holder 614 (see, e.g., FIG. 7A), among other things. In one embodiment, first coil 630 may be larger than second and third coils 632 and 634. For example, coils with different dimensions may be useful to facilitate movement of lens holder 614, such as, for example, to achieve autofocus functionality.

First, second, and third coils 630, 632, and 634 may be arranged in proximity to a plurality of permanent magnets. In one embodiment, magnets of imaging module 602 may be arranged in the corners of yoke 624. Thus, for example, each coil may be in proximity to one or more magnets. For example, first coil 630 may be arranged in proximity to magnets 636a1, 636b1, 636c1, and 636d1, as illustrated in FIGS. 6A and 6B. Portions of magnets 636a1, 636b1, 636c1, and 636d1 facing first coil 630 may comprise a polarity. Further, each of second and third coils 632 and 634 may also be arranged in proximity to one or more magnets.

In operation, first coil 630 may receive one or more current signals. In response to the received one or more current signals, an electromagnetic field may be induced about first coil 630. The induced electromagnetic field may interact with a magnetic field of one or more magnets such as, for example, 636a1, 636b1, 636c1, and 636d1. The induced electromagnetic field may therefore induce one or more forces, such as, for example, an attractive and/or repulsive magnetic force. For example, in response to the provided current, an attractive and/or repulsive force may induce movement of lens holder 614. In one case, the induced one or more forces may be such as to propel lens holder 614 along an optical axis defined by lens holder. For example, lens holder 614 may move vertically up or down, as arbitrarily shown in FIGS. 6A and 6B, an optical axis of lens holder 614. In this example, the movement of lens holder 614 may be useful for changing a focal length or focal ratio, among other things. Such principles of operation may be useful for focus-related functionality such as, for example, autofocus functionality, of an imaging module 612, among other things.

Independent of any current signals received by first coil 630, second coil 632 may receive one or more current signals. In response to the received one or more current signals, an electromagnetic field may lead to one or more forces between second coil 632 and one or more magnets such as, for example, magnets 632a2, 632b2, 632c2, and 632d2. The one or more forces may induce movement and/or rotation of lens holder 614 about an axis orthogonal or perpendicular to an optical axis defined by lens holder 614. For instance, the rotation of lens holder 614 may be about one of the x- and y-axes illustrated in FIG. 5C. Thus, said more generally, in one embodiment, one or more current signals to the second and/or third coils 632 and 634 may lead to tilting of lens holder 614 about axes orthogonal to the optical axis of lens holder 614. In one example, second and third coils 632 and 634 may be referred to as rotation coils. Such principles of operation may be useful for image stabilization-related functionality, among other things.

In one embodiment, coils, such as, for example, second and third coils 632 and 634 may be configured to facilitate rotation about an axis. For instance, second coil 632 may comprise at least a first and a second portion thereof, and an electromagnetic field induced on second coil 632 may be different as to the first and second portions of second coil 632. In one case, a first electromagnetic field of $X_1$ N/C may be induced at the first portion of second coil 632 while a second electromagnetic field of $X_2$ N/C may be induced at the second portion of second coil 632. Thus, for example, an attractive force may be induced at the first portion and a repulsive force may be induced at the second portion of second coil 632. The preceding discussion may also apply to third coil 632 as well. Of course, the preceding is offered to illustrate basic functionality, and is not intended to be taken in a restrictive sense. Indeed, limitless numbers of different embodiments are contemplated by the principles of the present disclosure.

In one embodiment, independent current signals may be transmitted to first, second, and/or third coils 630, 632, and 634. In one case, the independent current signals may be transmitted concurrently, partially concurrently, or at different times. Speaking broadly in terms of possible functionality, one example result of this principle is that, for example, autofocus functionality of lens holder 614 may operate independently as to image stabilization functionality of lens holder 614. Thus, for example, lens holder 614 may be capable of moving along an optical axis, while also rotating around at least one axis orthogonal to the optical axis. In this example, imaging module 602 may take advantage of autofocus functionality while concurrently or partially concurrently taking advantage of image stabilization functionality. It should be noted that, as one of ordinary skill in the art would appreciate, this is but one result of the preceding principles of operation.

Further, one or more springs may be connected to lens holder 614 and capable of returning lens holder 614 to a neutral and/or resting position as desired. For example, in one embodiment, one or more current signals may be applied to first coil 630 and may induce movement of lens holder 614 along the optical axis. At a point in time in which an image has been captured, lens holder 614 may be returned to a resting position via a spring or other mechanical and/or electromechanical mechanism.

Figures 7A, 7B:
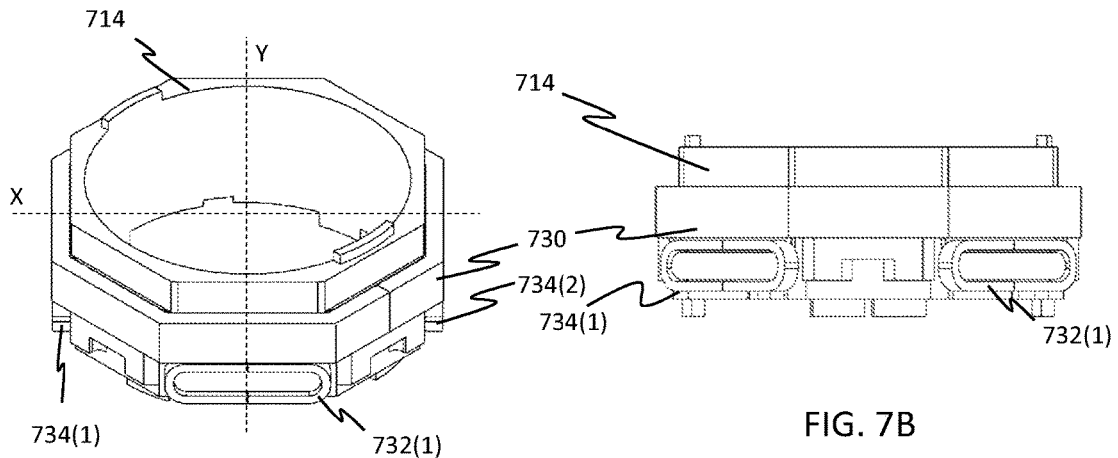
FIGS. 7A-7E illustrate different portions of an imaging module according to one embodiment.

FIGS. 7A-7E illustrate various components and views of one embodiment of an imaging module 702. For instance, FIGS. 7A and 7B are perspective and profile views, respectively, of a lens holder 714. Lens holder 714 may comprise an electromagnetic actuator comprising a first coil 730 attached to a surface of lens holder 714. Lens holder 714 may also comprise at least a first coil set 732 comprising coils 732a and 732b and at least a second coil set 734 comprising coils 734a and 734b. For instance, first coil set 732 may comprise a first coil 732a at a first position on lens holder 714 and a second coil 732b at a second position on lens holder 714. Coils 732a and 732b may be arranged on lens holder 714 so as to be on complementary sides of lens holder 714. For instance, coils 732a and 732b may be arranged on an axis, such as the y-axis illustrated in FIG. 7A, so as to be on opposite sides of lens holder 714. Likewise, second coil set 734 may comprise coils 734a and 734b, which may also be arranged on complementary sides of lens holder 714.

The electromagnetic actuator of imaging module 702 may also comprise a plurality of magnets as illustrated in FIGS.

Figure 7C:
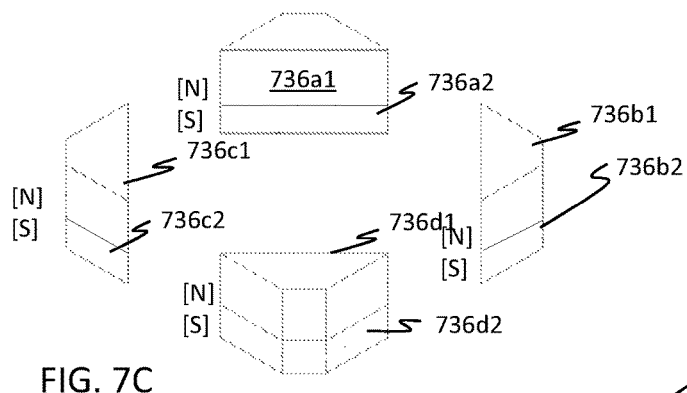
Figures 7D, 7E:
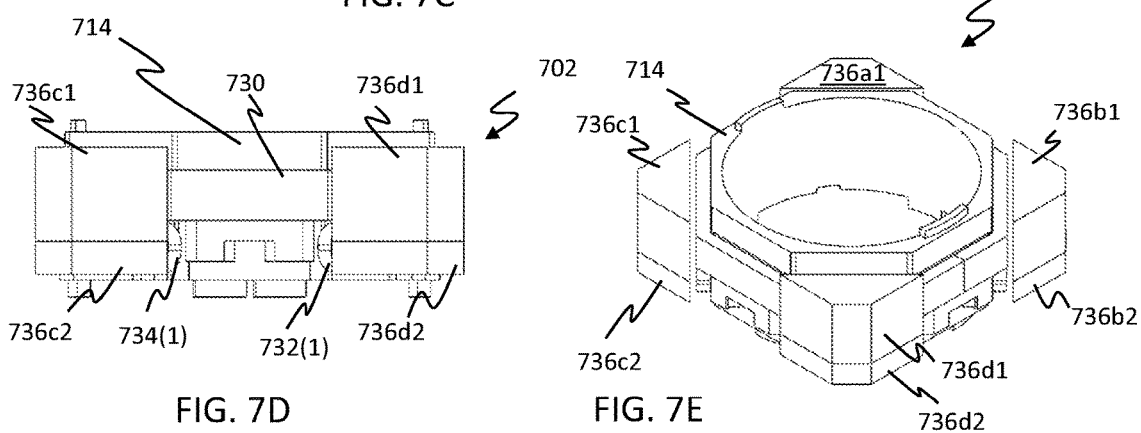

7C-7E. FIG. 7C illustrates one possible arrangement of magnets according to one embodiment. For instance, imaging module 702 may comprise a plurality of magnets arranged in proximity to the coils, such as first coil 730 and first coil set 732. In one embodiment, the magnets of imaging module 702 may comprise magnets 736a1, 736b1, 736c1, and 736d1 arranged in proximity to first coil 730. In one embodiment, magnets 736a2 and 736d2 may be arranged in proximity to first coil set 732, and magnets 736b2 and 736c2 may be arranged in proximity to second coil set 734. Thus, lens holder 714 may be configured such that the combination of coils 732a and 732b and magnets 736a2 and 736d2 may be capable of inducing rotation of lens holder 714 about the x-axis illustrated in FIG. 7A. Further, lens holder 714 may be configured such that the combination of coils 734a and 734b and magnets 736b2 and 736c2 may be capable of inducing rotation of lens holder 714 about the y-axis illustrated in FIG. 7A. Of course, any combination of magnets and coils of an electromagnetic actuator are contemplated by the present disclosure and the preceding discussion of possible structure and arrangement are not to be taken in a restrictive sense.

In operation, imaging module 702 may receive a signal related to changing a focal length or focal ratio of imaging module 702. For example, the received signal may be related to increasing or decreasing a focal length or focal ration by moving a lens assembly with relation to an image sensor (not shown). In this case, first coil 730 may receive one or more current signals. In response to the one or more current signals, an electromagnetic field may be induced about first coil 730, and the induced electromagnetic field may induce one or more forces acting between first coil 730 and at least one magnet, such as magnets 736a1, 736b1, 736c1, and 736d1. The one or more induced forces may comprise an attractive or a repulsive force. In response to the one or more induced forces, lens holder 714 may be propelled along an optical axis relative to an image sensor and/or the magnets of the electromagnetic actuator of lens holder 714.

Imaging module 702 may also receive one or more signals related to rotating lens holder 714 about one or more axes orthogonal to the optical axis. For example, the received one or more signals may be related to rotating lens holder 714 about the x- or y-axis illustrated in FIG. 7A. In one embodiment, one or more current signals may be received at first or second coil sets 732 and 734. For example, if the received one or more signals are related to rotating lens holder 714 about the y-axis, then coils 734a and 734b may receive one or more current signals and induce one or more forces. The induced one or more forces may comprise an attractive or a repulsive force, among other things. For instance, coil 734a may receive one or more current signals that may induce a downward force related to an interaction of a magnetic field between magnet 736c1 and magnet 736c2, while coil 734b may receive one or more current signals that may induce a upward force related to an interaction of a magnetic field between magnet 736b1 and magnet 736b2. Thus, a combination of induced forces may be such that lens holder 714 rotates about the y-axis. As one of ordinary skill in the art would appreciate, similar operation may be achieved around other axes, such as the x-axis. Indeed, rotation of lens holder 714 about the x-axis may be achieved by providing one or more current signals to coils 732a and 732b.

In one embodiment, similar functionality may be achieved by providing current signals to only one of the coils in a given coil set, such as, for example, coils 732a and 732b. For example, lens holder 714 may be configured such that to achieve rotation about an axis, such as the x-axis in FIG. 7A, one or more current signals may be transmitted to one of, for example, 732a and 732b. In this case, the transmitted one or more current signals may induce a force sufficient to induce rotation about the x-axis. In one example of such operation, one or more current signals may be received by coil 732a and may induce one or more forces, which may be sufficient to induce rotation about the x-axis. Of course, the preceding discussion is intended to illustrate general principles of operation and is not intended to be understood in a restrictive sense.

Figures 8A, 8B:
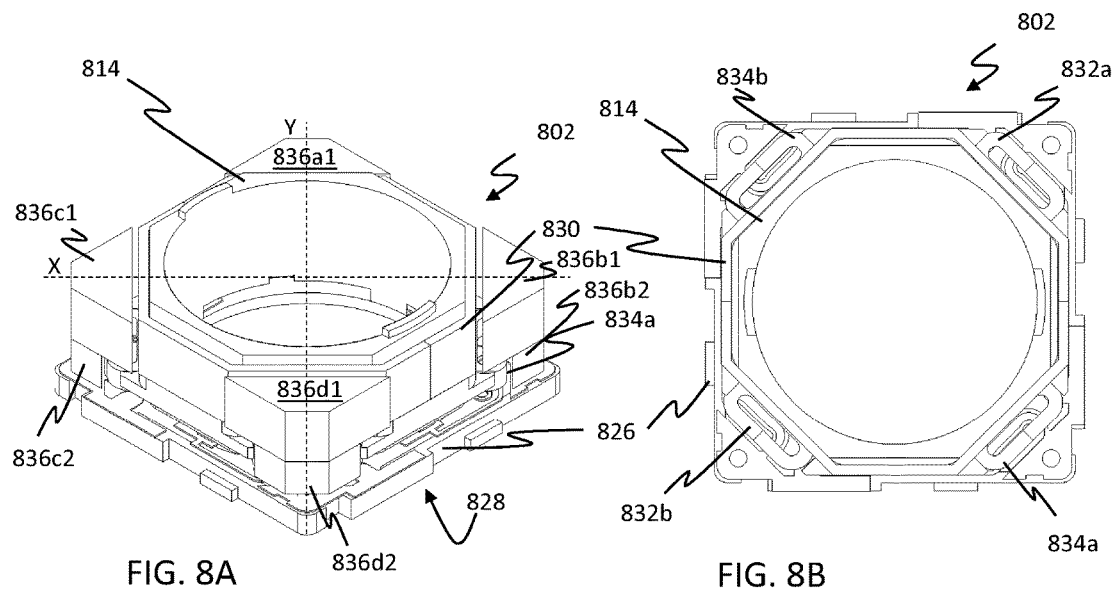
FIGS. 8A-8C illustrate different portions of an imaging module according to one embodiment.

FIGS. 8A-8B illustrate yet another embodiment of the present disclosure. Indeed, FIGS. 8A and 8B show an imaging module 802 comprising a lens holder 814, a first coil 830, first coil set 832 (comprising coils 832a and 832b), and second coil set 834 (comprising coils 834a and 834b). Imaging module 802 may also comprise a plurality of magnets such as magnets 836a1-836d2. In one embodiment, magnets 836a2-836d2 may comprise different dimensions than magnets 836a1-836d1. The difference in dimensions may be such as to receive one or more coils like first coil set 832 and second coil set 834. First coil set 832 and second coil set 834 may be placed at the bottom of lens holder 814. First and second coil sets 832 and 834 may define one or more planes perpendicular to the optical axis. First coil set 832 and second coil set 834 may be partially arranged under magnets 836a1-836d1 and adjacent to the polar surface of magnet 836a1-836d2.

In operation, one or more current signals may be transmitted to coils of an electromagnetic actuator in order to induce movement of lens holder 814. For instance, as discussed above, one or more current signals to first coil 830 may induce one or more electromagnetic forces and propel lens holder 814 along an optical axis. Further, one or more current signals may be received by first coil set 832 and may induce rotational movement of lens holder 814 about an axis orthogonal to the optical axis, such as, for example, the x-axis illustrated in FIG. 8A. One or more current signals may also be received by second coil set 834 and may induce rotational movement of lens holder 814 about, for example, the y-axis illustrated in FIG. 8A.

Figure 8C:
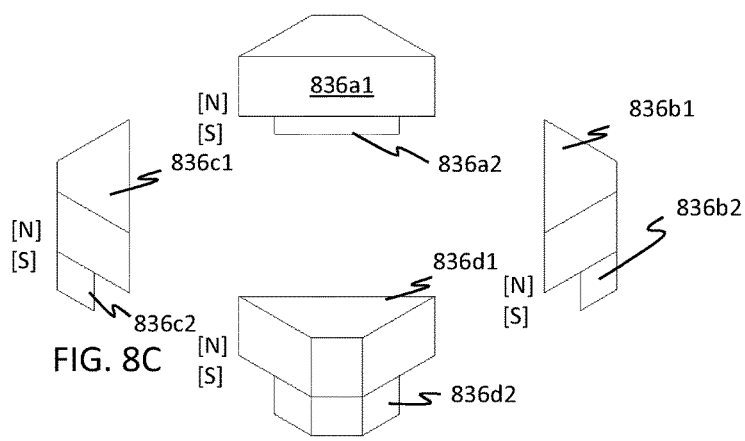

FIG. 8C shows magnets 836a, 836b, 836c, and 836d. Imaging module 802 may also receive one or more signals related to rotating lens holder 814 about one or more axes orthogonal to the optical axis. For example, the received one or more signals may be related to rotating lens holder 714 about the x- or y-axis illustrated in FIG. 8A. In one embodiment, one or more current signals may be received at first and/or second coil sets 832 and 834. For example, if the received one or more signals are related to rotating lens holder 814 about the y-axis, then second coil set 834 may receive one or more current pulses and induce one or more forces. For instance, one of second coil set 834 may receive one or more current signals that may induce a downward force, which downward force may be related to an interaction of an electromagnetic field of second coil set 834 and a magnetic field between magnets 836c1 and 836c2. Also, for instance, one of second coil set 834 may receive one or more current signals that may induce an upward force, which upward force may be related to an interaction of an electromagnetic field of second coil set 834 and a magnetic field between magnets 836b1 and 836b2. Thus, a combination of induced forces may be sufficient to induce rotation of lens holder 814 about the y-axis. As one of ordinary skill in the art would appreciate, similar operation may be achieved around other axes, such as the x-axis. Indeed, rotation of lens holder 814 about the x-axis may be achieved by providing one or more current signals to first coil set 832.

Figures 9A, 9B, 9C:
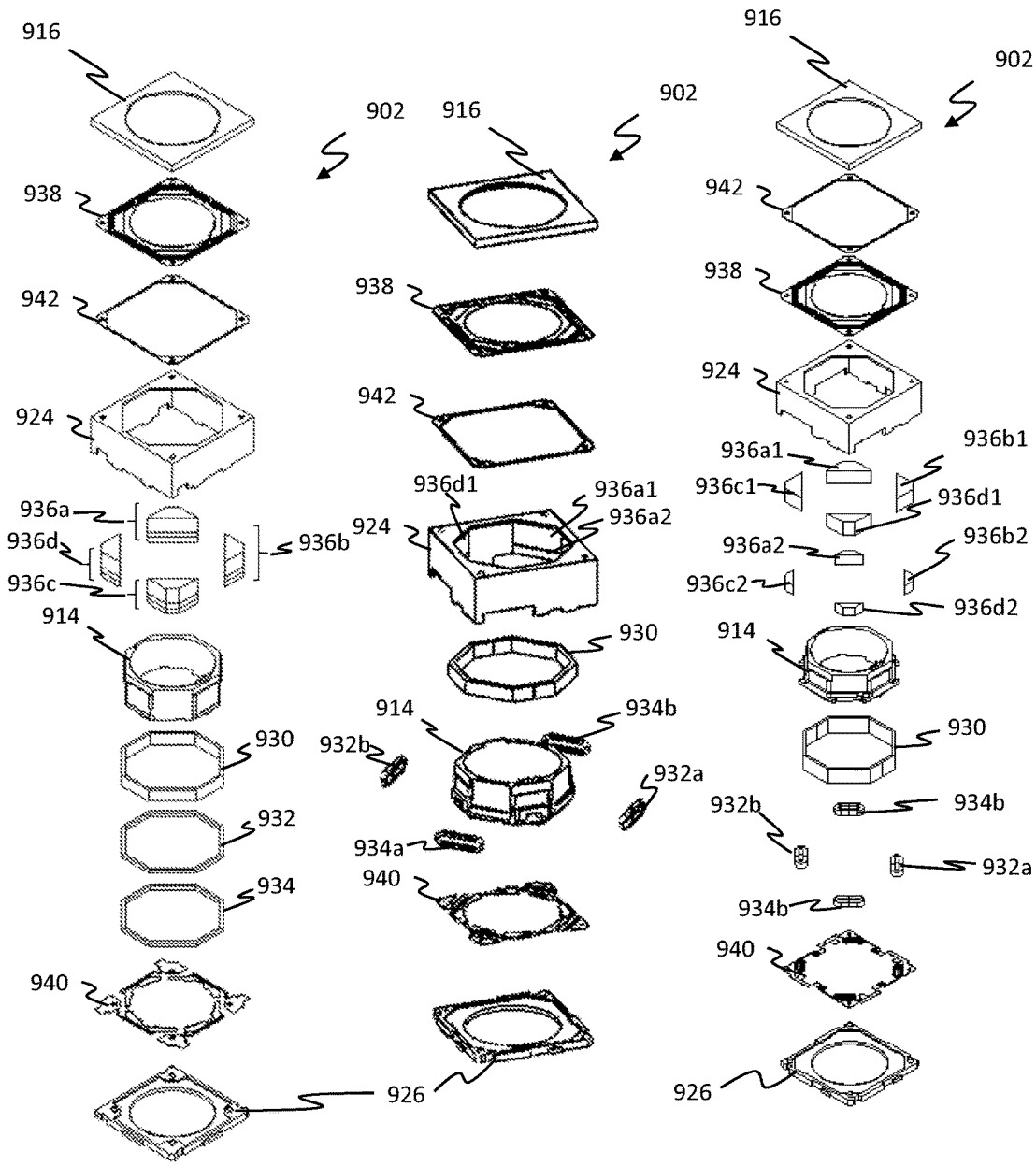
FIGS. 9A-9C illustrate portions of different embodiments of an imaging module.

FIGS. 9A-9C illustrate different embodiments of imaging modules 902. Referring to FIGS. 9A-9C together, an imaging module 902 may comprise an upper casing connected to a spacer 942 and/or an upper spring 938. The spacer 942 and upper spring 938 may be connected to a yoke 924 and/or a lens holder 914. A plurality of magnets may be connected to yoke 924. For instance, magnets 936a, 936b, 936c, and 936d shown in FIG. 9A may be arranged on an interior surface of yoke 924. In another embodiment, magnets 936a1-936d2 may be arranged on an interior surface of yoke 924. Lens holder 914 may be arranged within out casing 924 such that a plurality of coils attached to lens holder 914 are in proximity with the magnets in the yoke 924. For example, in one embodiment, first coil 930, second coil 932, and third coil 934 may be arranged in concentric circles (or other suitable shapes, such as hexagons and octagons, among other things) around an outer surface of lens holder 914, as shown in FIG. 9A. In another embodiment, first coil set 932 (comprising coils 932a and 932b) and second coil set 934 (comprising coils 934a and 934b) may be connected to lens holder 914 and arranged in proximity to magnets, for instance, 936a1-936d2 connected to an interior surface of yoke 924, as shown in FIG. 9B. Lens holder 914 may be connected to a lower spring 940 and a base 926.

In one embodiment, each of upper and lower springs 938 and 940 may be symmetric about one or more bisecting axes. The symmetry of upper and lower springs 938 and 940 may affect the position of the rotation center which may affect the tilting motion of lens holder 914. For example, the symmetry of the springs may assist in keeping the rotation center generally along the optical axis and minimizing and/or limiting translation motion of lens holder 914.

Figure 10A:
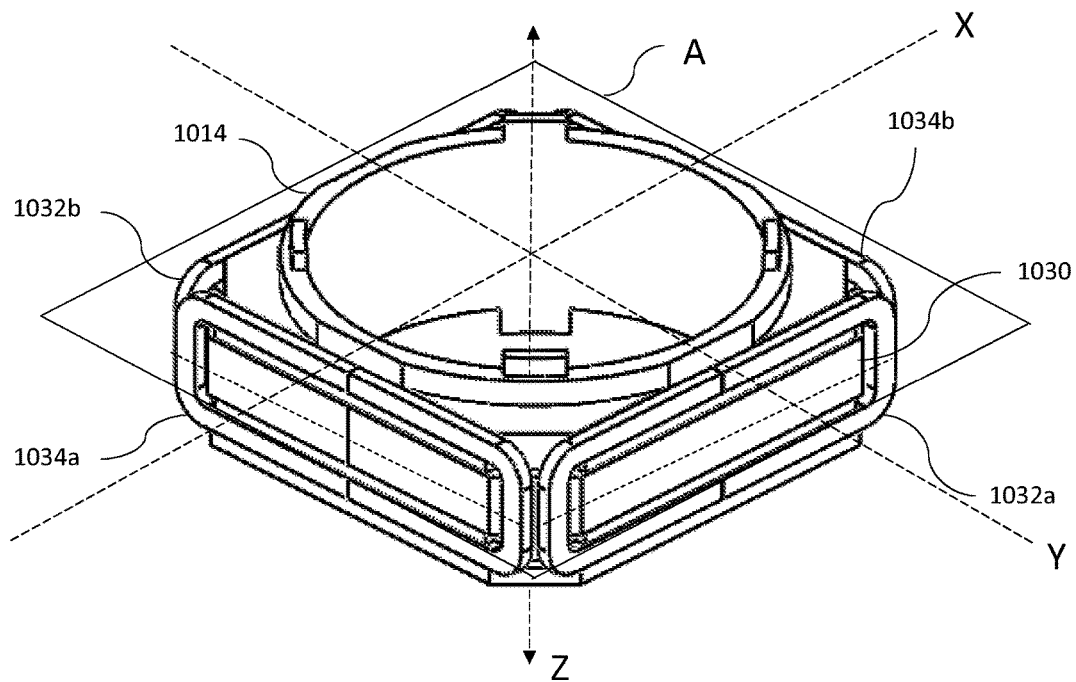
FIGS. 10A-10B illustrate a lens holder according to an embodiment.
Figure 10B:
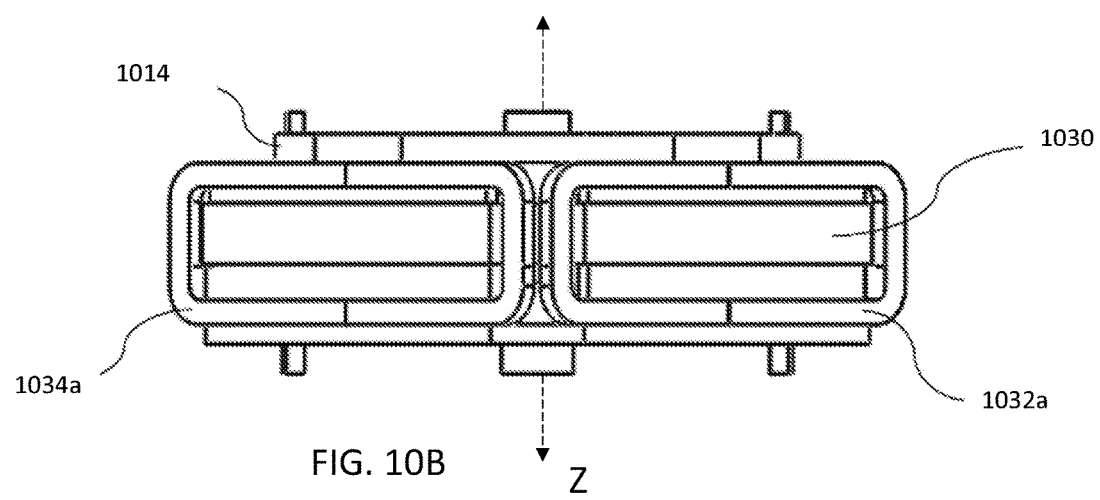

FIGS. 10A and 10B are perspective and profile views, respectively, of a lens holder 1014. In one embodiment, lens holder 1014 may comprise an electromagnetic actuator comprising a first coil 1030 attached to a surface of lens holder 1014. Lens holder 1014 may also comprise at least a first coil set 1032 comprising coils 1032a and 1032b and at least a second coil set 1034 comprising coils 1034a and 1034b.

In one embodiment, first coil set 1032 may comprise a first coil 1032a at a first position on lens holder 1014 and a second coil 1032b at a second position on lens holder 1014. Coils 1032a and 1032b may be arranged on lens holder so as to be on complementary sides of lens holder 1014. For instance, coils 1032a and 1032b may be arranged on an axis, such as the y-axis illustrated in FIG. 10A, on opposite sides of lens holder 1014 and arranged along the y-axis.

Furthermore, in one embodiment, first coil 1032a and second coil 1032b of first coil set 1032 may be arranged relative to first coil 1030 such that a portion of first coil 1030 passes through an opening in first coil 1032a and second coil 1032b. This implementation may allow first coil 1030 and first coil set 1032 to be approximately co-planar. Indeed, as illustrated by FIG. 10A, a horizontal plane, illustrated by plane A in FIG. 10A, may be substantially parallel with the x- and/or y-axes and running through the middle of first coil 1030. Further, it is noted that plane A also may pass through first coil set 1032 and second coil set 1034, as illustrated by the dotted line intersecting the vertical portions of coil 1034a and 1032a. Thus, it can be said that in this arrangement, first coil 1030 and first/second coil set 1032/1034 are approximately co-planar. To be clear, in one embodiment, whether first coil 1030 is centered within an opening of first coil set 1032, or whether first coil 1030 is offset within an opening of first coil set 1032 (see, e.g., FIG. 10B), a plane substantially parallel to the x- and/or y-axes illustrated in FIG. 10A that traverses first coil 1030 will still also intersect first coil set 1032. Advantageously, a co-planar relationship of coils, such as first coil 1030 and first coil set 1032 may permit imaging modules of a smaller size than traditional approaches.

In an embodiment, second coil set 1034 may comprise coils 1034a and 1034b, which may also be arranged on complementary sides of lens holder 1014. For instance, coils 1034a and 1034b may be arranged on an axis, such as the x-axis illustrated in FIG. 10A, so as to be on opposite sides of lens holder 1014 and arranged along the x-axis. In one embodiment, first coil 1030, first coil set 1032 and/or second coil set 1034 may be arranged at a relatively similar horizontal position on the optical axis. That is, in one embodiment, first coil 1030, first coil set 1032, and second coil set 1034 may be approximately co-planar.

In one implementation, first coil 1030 may be arranged such that a portion of first coil 1030 passes through an opening in second coil set 1034, similar to as described above in relation to first coil 1030 and first coil set 1032.

FIG. 10A also illustrates three axes: an x-axis, a y-axis, and a z-axis. In one embodiment, the z-axis may approximate and/or be substantially parallel with an optical axis of an imaging module. The x- and y-axes may be substantially perpendicular to the optical axis, or z-axis as illustrated in FIG. 10A. Additionally, the x- and y-axes may be substantially perpendicular one to another. In an implementation according to the present disclosure, a lens holder, such as lens holder 1014, may be arranged so as to move along its optical axis, such as, for example, to facilitate focus functionality. And a lens holder, such as lens holder 1014, may be arranged so as to rotate about one or more axes perpendicular to the optical axis of the lens holder. Thus, in one case, lens holder 1014 may be capable of moving parallel to the z-axis in FIG. 10A, and/or rotating about the x- and/or y-axes in FIG. 10A.

To illustrate, one or more electromagnetic actuators comprising, in one example, first coil 1030, first coil set 1032, second coil set 1034, and/or one or more magnets, may enable lens holder 1014 to move along and/or parallel with its optical axis (e.g., z-axis in FIGS. 10A and 10B), such as for focus-related functionality (e.g., autofocus). Additionally, the one or more electromagnetic actuators may also enable lens holder 1014 to rotate about one or more axes perpendicular (or substantially perpendicular) to the optical axis of lens holder 1014, such as for image stabilization-related functionality. For instance, in one case, an electromagnetic field may be induced between first coil 1032a and/or second coil 1032b of first coil set 1032 and one or more magnets to induce rotational motion about the x-axis illustrated in FIG. 10A. Similarly, an electromagnetic field may be induced between first coil 1034a and/or second coil 1034b of second coil set 1034 and one or more magnets to induce rotational motion about the y-axis illustrated in FIG. 10A. In one case, rotational motion about one or more axes perpendicular to an optical axis, such as the z-axis illustrated in FIG. 10A, may allow stabilization of lens holder 1014 to counteract potential movement thereof while an image is being captured by the imaging module.

FIG. 10B is a profile view and illustrates an arrangement of components of an electromagnetic actuator of an imaging module according to one embodiment. As is illustrated in FIG. 10B, in one embodiment, first coil 1030 may be slightly offset within first coil 1032a of first coil set 1032 and first coil 1034a of second coil set 1034. As will be discussed in further detail hereinafter, the arrangement of coils may be selected based, at least in part, on magnet size, polarity, orientation, and/or desired movement of lens holder 1014, among other things.

Figure 11:
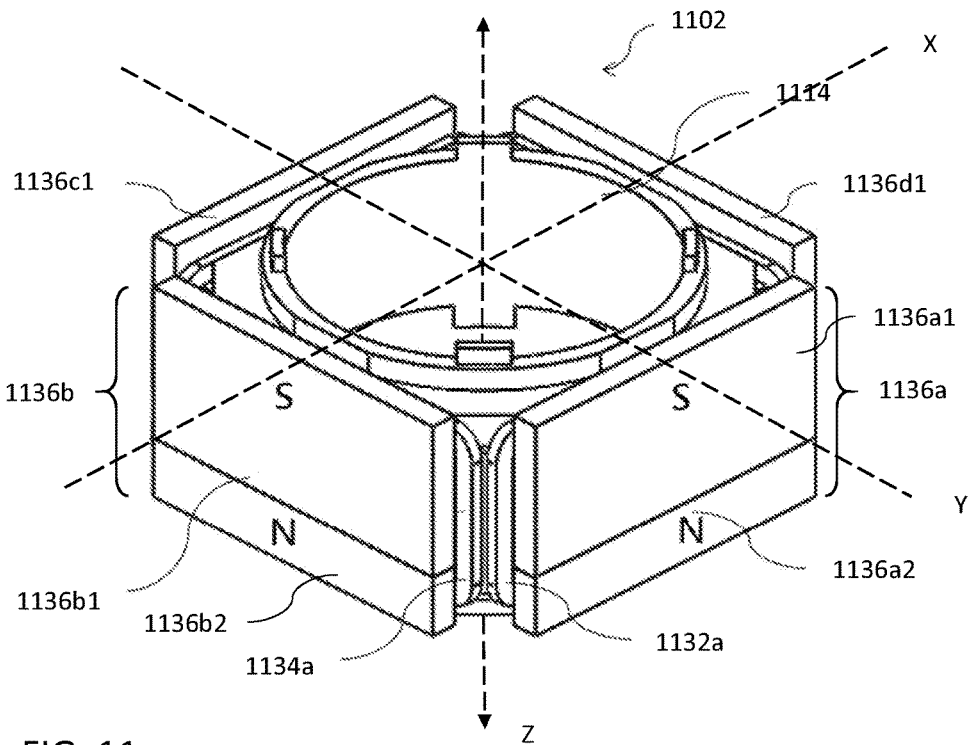
FIG. 11 is a perspective view of an imaging module according to an embodiment.

FIG. 11 is a perspective view of an imaging module 1102 illustrating an arrangement of magnets consistent with one embodiment. In one embodiment, the arrangement of lens holder 1114, a first coil (obscured in FIG. 11, but visible as first coil 1030 in FIGS. 10A and 10B), first coil set 1032, second coil set 1034, and magnets 1036*a*, 1036*b*, 1036*c*, and 1036*d* may be selected to facilitate movement of lens holder 1114 parallel with an optical axis (e.g., z-axis), and rotational movement of lens holder 1114 about one or more axes perpendicular to the optical axis (e.g., rotation about the x- and/or y-axes).

In one embodiment, magnet size and/or polarity may be selected so as to facilitate motion of lens holder 1114 along its optical axis and/or rotational motion about one or more axes perpendicular to the optical axis. For instance, in one case, magnet 1136*a* may comprise multiple portions or multiple magnets. For simplicity, magnets that comprise multiple parts or portions of different polarities and magnets comprising multiple individual magnets with respective polarities, are referred to merely as magnets. Therefore, reference to upper or lower magnets or portions of magnets is not to be taken in a limiting sense. Returning to FIG. 11, an upper magnet, such as upper magnet 1136*a*1, may be larger than lower magnets, such as lower magnet 1136*a*2. For instance, a size of upper magnets may be selected based, at least in part, on a size and arrangement of one or more coils, such as a first coil (obscured in FIG. 11, but visible as first coil 1030 in FIGS. 10A and 10B) and one or more coil sets (e.g., first coil set 1032 and second coil set 1034). In one case, a size and/or arrangement of an upper magnet may be selected to be completely or substantially adjacent to a first coil (e.g., first coil 1030 in FIG. 10A) and a portion of a first coil set, such as first coil set 1132. Similarly, the size and/or arrangement of the lower magnet, such as lower magnet 1136*a*2 may be selected such that the first coil is not adjacent to the lower magnet, while a portion of the first coil set is adjacent to the lower magnet. As such, magnet and coil size and arrangement may be selected to isolate electromagnetic interactions as desired to facilitate movement of lens holder 1114. It should be understood that other embodiments are also contemplated by the present disclosure. For instance, while in the foregoing discussion, a first coil is discussed as being in proximity to an upper magnet (e.g., 1136*a*1), in an alternative embodiment, the first coil may instead be arranged to be adjacent to a larger lower magnet (not shown). Additionally, the reader is reminded that the terms "upper" and "lower" are merely arbitrary terms to facilitate description.

Another factor to consider when selecting magnets for an electromagnetic actuator is polarity. For instance, in one embodiment, upper magnet 1136*a*1 may be arranged to have a first polarity on a surface external to lens holder 1114, and a second polarity on a surface facing lens holder 1114. Taking the example of upper magnet 1136*a*1 in FIG. 11, upper magnet 1136*a*1 may have a first polarity, S, on an outer surface, and a second polarity, N, on an inner surface facing lens holder 1114. Conversely, lower magnet 1136*a*2 may have a first polarity, N, on an outer surface, and a second polarity, S, on an inner surface facing lens holder 1114. Etc. Thus, in one embodiment, a polarity of a surface of a first magnet (e.g., upper magnet 1136*a*1) may be different from a polarity of a surface of a second magnet (e.g., lower magnet 1136*a*2) arranged above, below, and/or in proximity.

In one embodiment, an electromagnet actuator comprising a plurality of coils and a plurality of magnets may be capable of inducing movement of lens holder 1114 parallel with an optical axis of lens holder 1114 (e.g., z-axis) and inducing rotational movement of lens holder 1114 about one or more axes perpendicular to the optical axis (e.g., x- and/or y-axes).

Figure 12A:
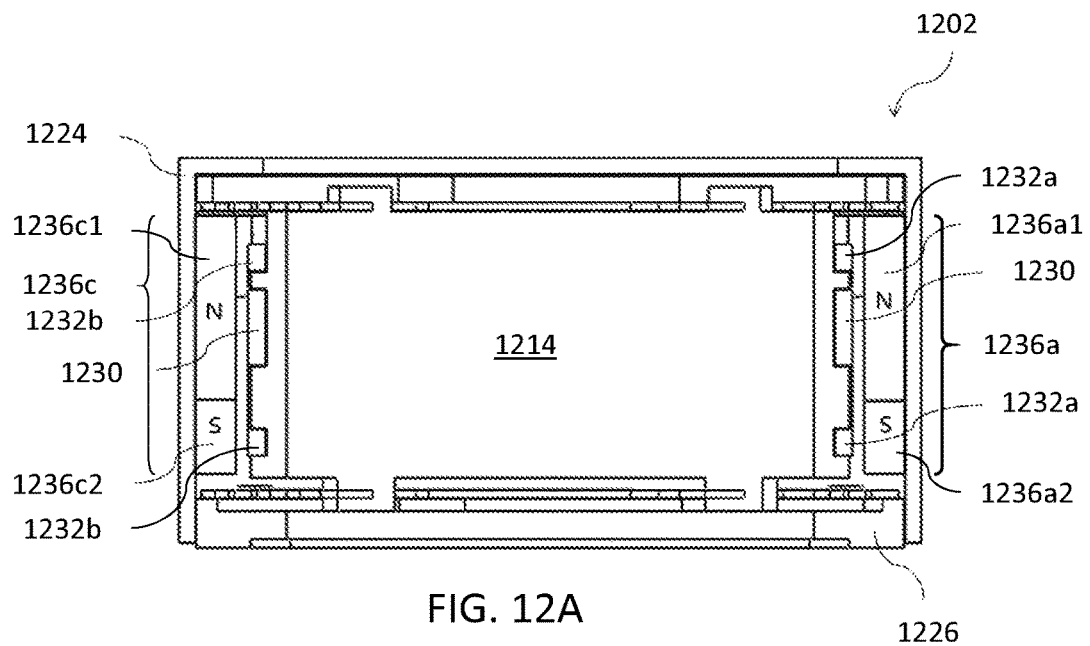
FIGS. 12A-12B are cross sections of an imaging module according to one embodiment.
Figure 12B:
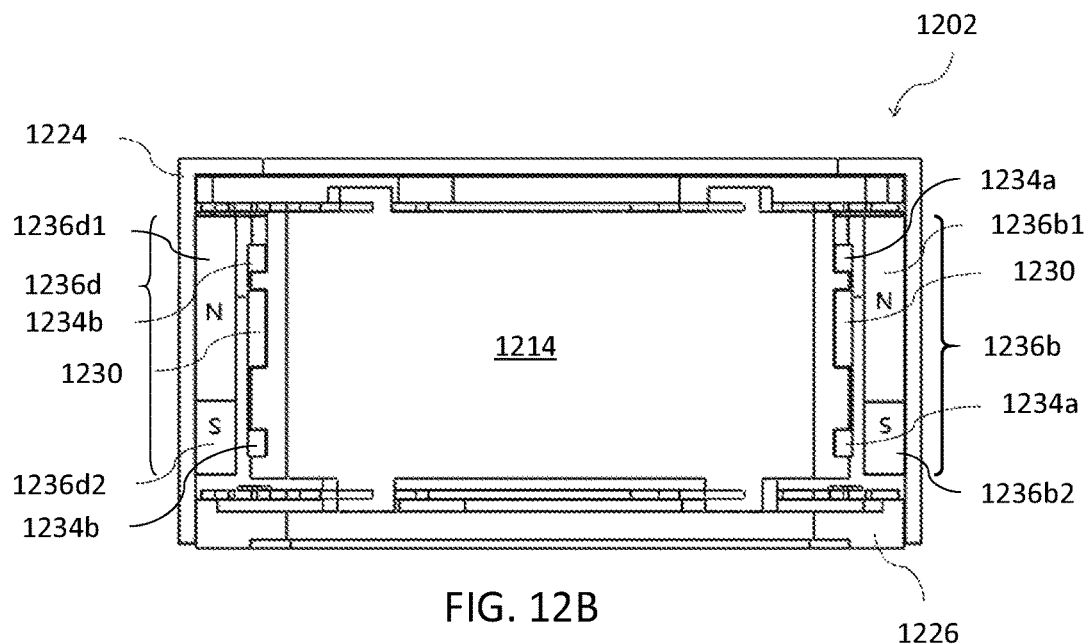

FIGS. 12A and 12B show cross sections of imaging module 1202 as may be viewed if the imaging module 1102 in FIG. 11 were divided along the x- and y-axes. As illustrated in FIGS. 12A and 12B, imaging module 1202 comprises a yoke 1224, and a base 1226. Circuitry, such as, for example, a controller (not shown), may be integrated into base 1226. Yoke 1224, and base 1226 may comprise any suitable materials including, but not limited to, plastics, metals, metal alloys, and other lightweight synthetic materials.

Lens holder 1214 may be arranged within yoke 1224 and base 1226 of imaging module 1202. In one embodiment, one or more springs (see 1538 and 1540 of FIGS. 15A and 15B) may assist in providing functionality of imaging module 1202, such as by returning lens holder 1214 to a rest position. In one embodiment, a plurality of coils such as, for example, first coil 1230, first coil set 1232, and second coil set 1234 may be attached to lens holder 1214. First coil 1230 and first and second coil sets 1232 and 1234, respectively, may be arranged at different positions of an outer portion of lens holder 1214 (see e.g. FIG. 10), among other things. In one embodiment, first coil 1230 may be larger than first and second coil sets 1232 and 1234. For example, coils with different dimensions may be useful to facilitate movement of lens holder 1214, such as, for example, to achieve focus-related functionality (e.g., autofocus), such as, for example, changing a focal length of imaging module 1202. In one embodiment, first coil 1230 and first and second coil sets 1232 and 1234, respectively, may be arranged on a same or similar horizontal position on the optical axis, and may be considered substantially co-planar. In embodiments, such as illustrated in FIGS. 12A and 12B, if a plane, such as plane A shown in FIG. 10A, passes through at least a portion of first coil 1230, the plane will also pass through portions of first and second coil sets 1232 and 1234, respectively. For example, vertical portions of first coil set 1232 may be intersected by the plane, and vertical portions of second coil set 1234 may also be intersected by the plane (not visible in FIGS. 12A and 12B, because the cross-section does not show those vertical portions of first and second coil sets 1232 and 1234, but may be understood by reference to FIG. 10A and the dotted line traversing first coil 1230 and coil 1034*a* and 1032*a*). Embodiments, such as the foregoing, where first coil 1230 is arranged relative first and second coil sets 1232 and 1234 such that a plane that is substantially perpendicular to the optical axis and intersects the first coil 1230 and at least a portion of first and second coil sets 1232 and 1234 are considered to be substantially co-planar.

In one embodiment, first coil 1230 and first and second coil sets 1232 and 1234, respectively, may be arranged in proximity to a plurality of permanent magnets 1236*a*-1236*d*. In another embodiment, magnets may be arranged in the corners of yoke 1224, as shown in FIG. 15B. Thus, for example, each coil may be in proximity to one or more magnets. For example, first coil 1230 and second coil 1232*b* (of first coil set 1232) may be arranged in proximity to magnet 1236*c*, as illustrated in FIG. 12A. First coil 1230 and second coil 1234*b* (of second coil set 1234) may be arranged in proximity to magnet 1236*d* as illustrated in FIG. 12B. First coil 1230 and first coil 1232*a* (of first coil set 1232)

may be arranged in proximity to magnet 1236a, as illustrated in FIG. 12A. First coil 1230 and first coil 1234a (of second coil set 1234) may be arranged in proximity to magnet 1236b, as illustrated in FIG. 12A.

In one embodiment, an arrangement of one or more coils relative to one or more magnets may be used in order to facilitate operation of an electromagnetic actuator. FIG. 12A illustrates an upper portion of first coil 1232a (of first coil set 1232) and a portion of first coil 1230 adjacent to upper magnet 1236a1. A lower portion of first coil 1232a (of first coil set 1232) may be adjacent to a lower magnet 1236a2. Similarly, an upper portion of second coil 1232b (of first coil set 1232) and a portion of first coil 1230 may be adjacent to upper magnet 1236c1. A lower portion of second coil 1232b (of first coil set 1232) may be adjacent to lower magnet 1236c2.

Figure 14:
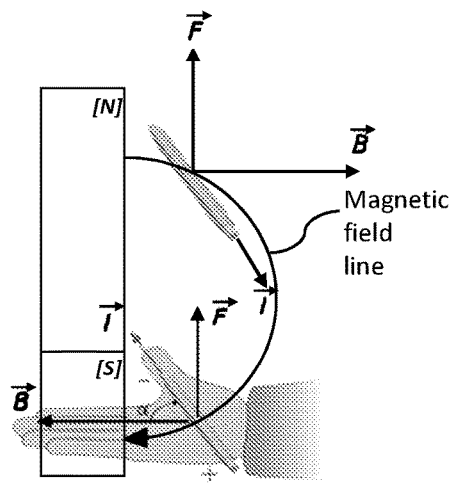
FIG. 14 illustrates interaction of a current carrying wire within a magnetic field using the right hand rule, according to one embodiment.

In operation, one or more current pulses or current signals may be sent to first coil 1230 and/or first coil set 1232 in order to induce one or more electromagnetic forces and/or fields and so as to induce movement of lens holder 1214. For instance, an electromagnetic actuator may be capable of inducing movement of lens holder 1214 substantially parallel with its optical axis. To illustrate, the reader is referred to FIG. 14, which shows two magnets, of which one is a larger upper magnet and another is a smaller lower magnet (e.g., upper and lower magnets 1236a1 and 1236a2) in proximity to a coil. As shown, a magnetic field may be induced by the magnets, as illustrated by the exemplary magnetic field line. Also illustrated is a hand, which refers to the right-hand rule and may be useful to assist the reader in understanding directions in which fields, forces, and/or movement may be induced. As shown, one or more current pulses may be applied to a coil at a lower position (e.g., electrons flowing in a direction indicated by the thumb of the right hand rule). Responsive to the one or more current pulses, an electric or current force (e.g., $\vec{I}$) and a magnetic force (e.g., $\vec{B}$) may yield a total force (e.g., $\vec{F}$), which may act to induce movement of the coil in FIG. 14. Applying this explanation to, for instance, lens holder 1214 of FIG. 12A, one or more current pulses on a first portion of first coil set 1232 (e.g., a lower portion) may also be sufficient to yield a total force (e.g., $\vec{F}$), as illustrated in FIG. 14. For instance, in a case similar to that illustrated in FIG. 14, a portion of first coil set 1232 (e.g., the lower portion of 1232a illustrated below first coil 1230 and adjacent to lower magnet 1236a2) may receive one or more current pulses in a direction similar to that of the illustration in FIG. 14, and may result in a force $\vec{F}$ that induces movement of the coil substantially parallel to the direction of force $\vec{F}$.

Similarly, and as illustrated by the upper coil in FIG. 14, one or more current pulses in a different direction may be sufficient to induce movement of the coil substantially parallel to the direction of force $\vec{F}$. Furthermore, use of a coil that loops from a lower position to an upper position, as illustrated in FIG. 14, may be capable of inducing a force relative to both the upper portion and the lower portion of the coil with the same current pulse. For instance, if the lower coil of FIG. 14 loops around and is connected to the upper coil, a current signal traveling in the direction of the thumb in the lower coil will also travel consistent with the right hand rule in the upper coil and also induce an upward force $\vec{F}$. As would be understood by those of in the field, a selection of one or more current pulses, a selection of one or more magnets, magnet sizes, polarity, and arrangement, and an arrangement of all of the parts thereof may yield an apparatus capable of moving in a plurality of directions and/or orientations. For instance, and as has already been discussed above, in one embodiment, a lens holder may be capable of moving substantially parallel to its optical axis, and the lens holder may also be capable of rotating about one or more axes substantially perpendicular to its optical axis. For example, referring to the upper portion of first coil set 1232 (e.g., the upper portion of 1232a illustrated above first coil 1230 and adjacent to upper magnet 1236a1) may receive one or more current pulses in a direction different from those received on the lower portion of first coil set 1232 (e.g., because of the looped architecture of first coil set 1232), and an upward force $\vec{F}$ may be induced.

Figure 13:
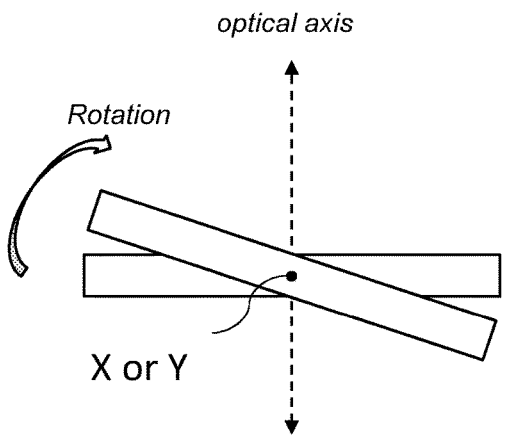
FIG. 13 illustrates rotation of an item about an axis perpendicular to an optical axis as is discussed in certain embodiments.

FIG. 13 illustrates an optical axis of a lens and/or a lens holder and an axis perpendicular to the optical axis (either an x- or y-axis). Consistent with the foregoing, it may be possible to induce rotational movement of a lens and/or lens holder about an axis substantially perpendicular to an optical axis using an electromagnetic actuator.

Returning to FIGS. 12A and 12B, first coil 1230 may receive one or more current signals. In response to the received one or more current signals, an electromagnetic field may be induced about first coil 1230. The induced electromagnetic field may interact with a magnetic field of one or more magnets such as, for example, 1236a-1236d. The induced electromagnetic field may therefore induce one or more forces, such as, for example, an attractive and/or repulsive magnetic force. For example, in response to the provided current, an attractive and/or repulsive force may induce movement of lens holder 1214. In one case, the induced one or more forces may be such as to propel lens holder 1214 along an optical axis of lens holder 1214. For example, lens holder 1214 may move vertically up or down, as arbitrarily shown in FIGS. 10A and 10B, an optical axis of lens holder 1214, which may be substantially parallel with the z-axis. In this example, the movement of lens holder 1214 may be useful for changing a focal length or focal ratio, among other things. Such principles of operation may be useful for focus-related functionality such as, for example, autofocus functionality, of an imaging module 1202, among other things.

Independent of any current signals received by first coil 1230, first coil set 1232 may receive one or more current signals. In response to the received one or more current signals, an electromagnetic field may lead to one or more forces between first coil set 1232 and one or more magnets such as, for example, magnets 1236a and 1236c. The one or more forces may induce movement and/or rotation of lens holder 1214 about an axis orthogonal or perpendicular to an optical axis defined by lens holder 1214. For instance, the rotation of lens holder 1214 may be about one of the x- and y-axes illustrated in FIG. 10A. Thus, said more generally, in one embodiment, one or more current signals to the first and/or second coil sets 1232 and 1234 may lead to tilting or rotating of lens holder 1214 about axes orthogonal or substantially perpendicular to the optical axis of lens holder 1214. In one example, first and second coil sets 1232 and 1234 may be referred to as rotation coils. Such principles of operation may be useful for image stabilization-related functionality, among other things.

Returning then to FIG. 12A and the arrangement of magnets 1236a1 and 1236c1 relative to first coil 1230, it may be possible to send one or more current pulses or current signals to first coil 1230 to induce one or more electromagnetic forces, as discussed above in relation to FIG. 14. Indeed, in one implementation, it may be possible to induce a force sufficient to induce movement of lens holder 1214 substantially parallel with its optical axis.

In one implementation, it may be possible to induce one or more forces relative to first coil set 1232 to cause lens holder 1214 to rotate about an axis substantially perpendicular to an optical axis of lens holder 1214. For example, consistent with FIG. 14, a first set of current pulses may be sent to a lower portion of first coil 1232a to induce a force $\vec{F}$ in an upward direction. A second set of current pulses may be sent to an upper portion of first coil 1232a to also induce a force $\vec{F}$ in an upward direction. As such, a portion of lens holder 1214 in contact with first coil 1232a may experience a force in an upward direction. Concurrently or substantially concurrently therewith, a first set of current pulses may be sent to an upper portion of second coil 1232b and a second set of current pulses may be sent to a lower portion of second coil 1232b. The current pulses sent to second coil 1232b may be sufficient to induce a downward force $\vec{F}$ to induce downward movement of a portion of lens holder 1214 in contact with second coil 1232b. In one case, the forces caused by the plurality of current pulses may be sufficient to induce rotational movement of lens holder 1214 about an axis perpendicular to an optical axis of lens holder 1214 (e.g., about the x-axis illustrated in FIG. 11).

FIG. 12B illustrates a cross section of imaging module 1202 from a different perspective. In one embodiment, a first coil 1234a (of second coil set 1234) may be arranged in proximity to an upper magnet 1236b1 and a lower magnet 1236b2. A second coil 1234b (of second coil set 1234) may be arranged in proximity to an upper magnet 1236d1 and a lower magnet 1236d2. This arrangement of coils and magnets may be useful for anti-shake functionality, among other things, consistent with the above explanation of FIGS. 13 and 14. In one implementation, first coil 1230 may be arranged in proximity to an upper magnet 1236b1 and another upper magnet 1236d1. As such, one or more current pulses to first coil 1230 may act to induce movement of lens holder 1214 substantially parallel to an optical axis of imaging module 1202. This arrangement of coil and magnets may be useful for focus-related functionality (e.g., autofocus), among other things, consistent with the above explanation of FIG. 14.

In another embodiment, coils, such as, for example, first and second coil sets 1232 and 1234 may be configured to facilitate rotation about an axis. For instance, first coil set 1232 may comprise at least a first coil 1232a and a second coil 1232b, and an electromagnetic field induced on first coil set 1232 may be different as to first coil 1232a and second coil 1232b. In one case, a first electromagnetic field of $X_1$ N/C may be induced at first coil 1232a while a second electromagnetic field of $X_2$ N/C may be induced at second coil 1232b. Thus, for example, an attractive force may be induced at first coil 1232a and a repulsive force may be induced at second coil 1232b. The preceding discussion may also apply to second coil set 1234. Of course, the preceding is offered to illustrate basic functionality, and is not intended to be taken in a restrictive sense. Indeed, limitless numbers of different embodiments are contemplated by the principles of the present disclosure.

In one implementation, independent current signals may be transmitted to first coil 1230 and/or first and/or second coil sets 1232 and 1234, respectively. In one case, the independent current signals may be transmitted concurrently, partially concurrently, or at different times. Speaking broadly in terms of possible functionality, one example result of this principle is that, for example, focus-related functionality (e.g., autofocus) of lens holder 1214 may operate independently from image stabilization or anti-shake related functionality of lens holder 1214. Thus, for example, lens holder 1214 may be capable of moving along an optical axis, while also rotating around at least one axis orthogonal to the optical axis. In one example, imaging module 1202 may take advantage of autofocus functionality while concurrently or partially concurrently taking advantage of image stabilization functionality.

Further, one or more springs (see, e.g., springs 1538 and 1540 of FIG. 15A) may be connected to lens holder 1214 and may be capable of returning lens holder 1214 to a neutral and/or resting position, as desired. For example, in one embodiment, one or more current signals may be applied to first coil 1230 and may induce movement of lens holder 1214 along the optical axis. At a point in time in which an image has been captured, lens holder 1214 may be returned to a resting position via a spring or other mechanical and/or electromechanical mechanism.

FIGS. 15A-15B illustrate different embodiments of imaging modules 1502. Referring to FIGS. 15A-15B together, an imaging module 1502 may comprise a spacer 1542 and/or an upper spring 1538 and/or a spring spacer 1544. The spacer 1542, upper spring 1538 and the spring spacer 1544 may be connected to a yoke 1524 and/or a lens holder 1514. A plurality of magnets may be connected to yoke 1524. For instance, magnets 1536a, 1536b, 1536c, and 1536d shown in FIG. 15A may be arranged on an interior surface of yoke 1524. In another embodiment, magnets 1536a, 1536b, 1536c and 1536d may be arranged on an interior surface of the corners of yoke 1524, as shown in FIG. 15B. A spacer set 1546 may be arranged in between the magnets 1536a, 1536b, 1536c and 1536d as shown in FIG. 15A. Lens holder 1514 may be arranged within the yoke 1524 such that a plurality of coils attached to lens holder 1514 may be in proximity with the magnets in the yoke 1524. For example, in one embodiment, the first coil 1530, the first coil set and the second coil set, 1532 and 1534, respectively, may be located at relatively a same or similar horizontal position on the optical axis. First coil 1530 may be arranged on an outer surface of the lens holder 1514. First and second coil sets 1532 and 1534, respectively, may be arranged on the outer surface of the first coil 1530 as illustrated by the embodiment of FIGS. 10A and 10B, such that a portion of first coil 1530 may pass through or be exposed through an opening in first and second coil sets 1532 and 1534. The shape of the first coil 1530 may be circular, or other suitable shapes, such as hexagonal, octagonal, oval, or substantially rectangular, among other things.

In one embodiment, upper and lower springs 1538 and 1540 may be symmetric or substantially symmetric about one or more bisecting axes. The symmetry of upper and lower springs 1538 and 1540 may affect the position of the rotation center which may affect the tilting motion of lens holder 1514. For example, the symmetry of the springs may assist in keeping a rotation center generally along the optical axis and minimizing and/or limiting translation motion of lens holder 1514. In one embodiment, a base 1526 may be connected to yoke 1524 to contain the components of imaging module 1502. Additionally, it is noted that in one embodiment, the electromagnetic actuator and lens holder 1514 may be arranged between upper and lower springs 1538 and 1540.

Figure 16A:
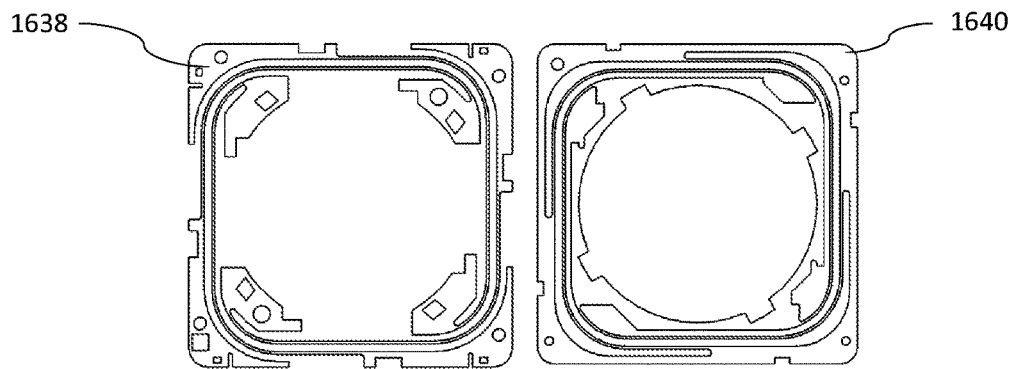
FIGS. 16A-16B illustrate sample springs suitable for different embodiments.
Figure 16B:
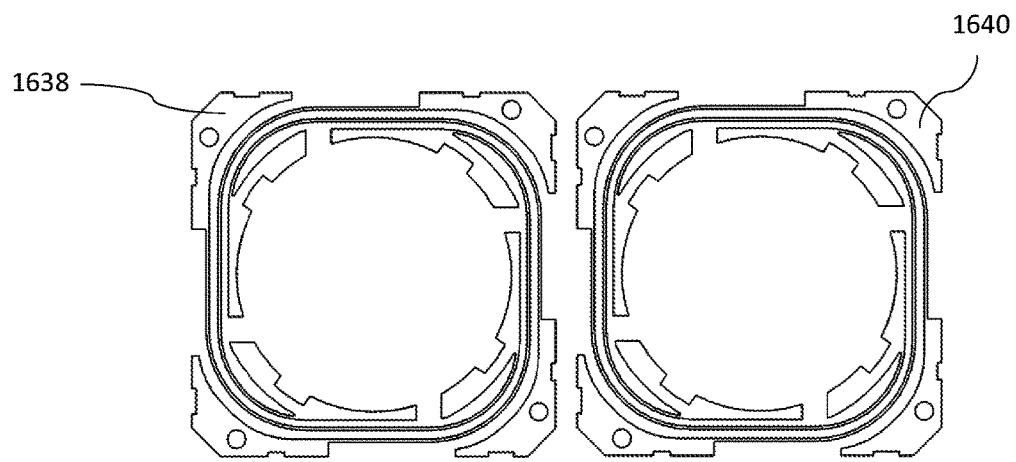

FIGS. 16A and 16B show different upper and lower springs 1638 and 1640 design embodiments, consistent with the above discussion of maintaining a rotational center for a lens holder, such as lens holder 1514. In one implementation, upper and lower springs 1638 and 1640 may have different shapes as shown in FIG. 16A. In another example, upper and lower springs 1638 and 1640 may be similar as shown in FIG. 16B. Selection of spring design may be made consistent with the foregoing discussion in order to yield desired motion and/or rotation.

Figure 17:
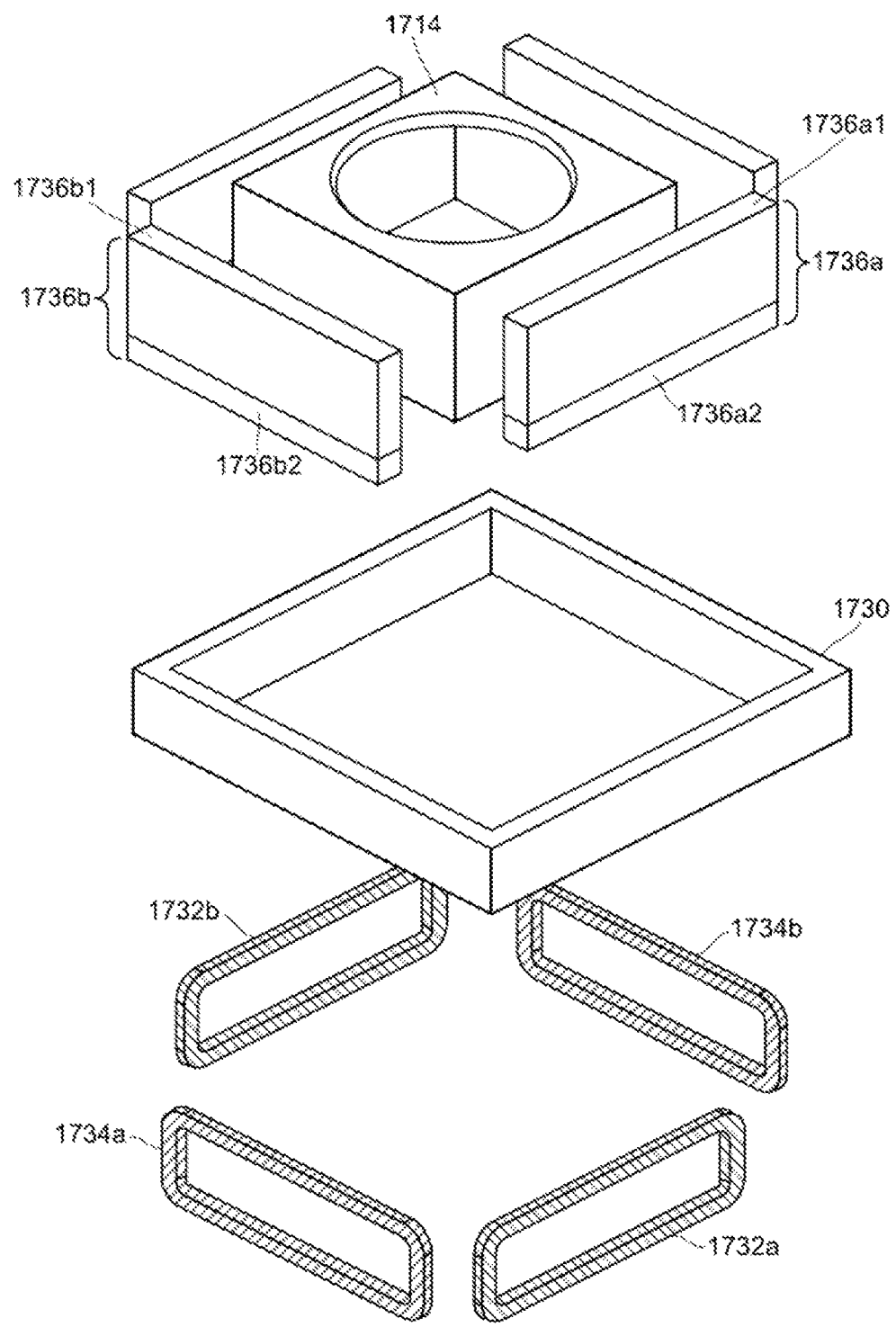
FIG. 17 illustrates portions of different embodiments of an imaging module according to an embodiment.

FIG. 17 illustrates portions of an imaging module according to an embodiment. As opposed to embodiments discussed above wherein coils are arranged on a lens holder, the embodiment illustrated in FIG. 17 arranges a plurality of magnets on lens holder 1714. As illustrated, magnets 1736*a*, 1736*b*, 1736*c* (illustrated behind magnet 1736*b*), and 1736*d* (illustrated behind magnet 1736*a*) may be arranged directly on lens holder 1714. Magnets 1736*a*-1736*d* may include portions and/or parts of different polarities, and/or separate sub-magnets. In one embodiment, one portion and/or part of a magnet may be larger or smaller than another part and/or portion of a magnet. For example, magnet 1736*a* may comprise a first part or portion, magnet 1736*a*1, which may be larger than a second part or portion, magnet 1736*a*2. As discussed above with respect to other embodiments, the size of magnets relative to other magnets may be determined based, at least in part, on a size and/or arrangement of coils. For example, if it is desired that a magnet be capable of interacting with a field induced by one or more coils, then the magnet may be sized and/or arranged according to the size and/or arrangement of the one or more coils and/or induced field, in order to be in proximity of the field and capable of inducing movement of a lens holder, such as lens holder 1714.

In an embodiment, a coil 1730 may be arranged around and in proximity to magnets 1736*a*-1736*d*, so as to be capable of inducing movement of lens holder 1714, such as substantially parallel with an optical axis of lens holder 1714. In another embodiment, a first coil set 1732 and a second coil set 1734 may also be arranged around magnets 1736*a*-1736*d*, so as to be capable of inducing rotation of lens holder 1714 about one or more axes substantially perpendicular to an optical axis of lens holder 1714.

FIG. 18 illustrates an embodiment, similar to that illustrated in FIG. 17, in which a first coil 1830, a first coil set 1832 (comprised of coils 1832*a* and 1832*b*), and a second coil set 1834 (comprised of coils 1834*a* and 1834*b*) are arranged around magnets 1836*a*, 1836*b*, 1836*c* (obscured behind lens holder 1814), and 1836*d* (obscured behind lens holder 1814). As illustrated, in one embodiment, a portion of first coil 1830 may be visible or exposed through a central portion of first and second coil sets 1832 and 1834, respectively. For instance, first coil 1830 may be arranged such that a portion of first coil 1830 may be exposed as to magnet 1836*a*1 through, for example, the opening of first coil 1832*a* of first coil set 1832, so to allow a magnetic field induced on first coil 1830 to interact with magnet 1836*a*1.

In one embodiment, first coil 1830, first coil set 1832, and second coil set 1834 may be arranged so as to be substantially co-planar. For instance, plane A in FIG. 18 illustrates a plane that is substantially perpendicular to an optical axis of lens holder 1814 (e.g., the z-axis). As shown by the broken line intersecting first coil 1830, a plane substantially perpendicular to the optical axis (e.g., plane A) that intersects first coil 1830, will also intersect at least a portion of first and second coil sets 1832 and 1834. As such, as explained above, in this implementation, first coil 1830, first coil set 1832, and second coil set 1834 are substantially co-planar.

In one implementation, while magnets 1836*a*-1836*d* may be arranged on lens holder 1814, first coil 1830, first coil set 1832, and second coil set 1834 may be arranged on the interior of a yoke (see, e.g., yoke 1524 in FIG. 15A) and/or other structure suitable for maintaining first coil 1830, first coil set 1832, and second coil set 1834 in proximity to magnets 1836*a*-1836*d*.

In one embodiment, one or more current pulses to at least one of first coil 1830, first coil set 1832, or second coil set 1834 may induce movement of lens holder 1814 in one or more directions. For example, one or more current signals may be sent to first coil 1830, and the one or more current signals may be sufficient to generate a magnetic field with which magnets 1836*a*1, 1836*b*1, 1836*c*1, and 1836*d*1 may interact, such as to cause movement of lens holder 1814 to which magnets 1836*a*-1836*d* are attached.

In one embodiment, one or more current signals on one or more coils of first coil set 1832 or second coil set 1834 may induce rotational movement of lens holder 1814 about one or more axes substantially perpendicular to an optical axis of lens holder 1814, similar to the discussion of FIGS. 10A, 10B, and 11. In another embodiment, one or more current signals on at least first coil 1830 may induce movement of lens holder 1814 substantially parallel with an optical axis of lens holder 1814, similar to the discussion of FIGS. 10A, 10B, and 11.

One skilled in the art will recognize that a virtually unlimited number of variations to the above descriptions are possible, and that the examples and the accompanying figures are merely to illustrate one or more particular implementations for illustrative purposes. They are not therefore intended to be understood restrictively.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. A compact camera module comprising
a lens holder; and
an electromagnetic actuator connected to the lens holder, the electromagnetic actuator comprising:
a first coil configured to induce movement of the lens holder substantially parallel with an optical axis of the lens holder;

a first coil set configured to induce rotation of the lens holder about a first axis substantially perpendicular to the optical axis;

a second coil set configured to induce rotation of the lens holder about a second axis substantially perpendicular to the optical axis, wherein a portion of the first coil is disposed through a central portion of a coil of at least one coil set of the first and second coil sets; and a plurality of magnets disposed in proximity to the first coil and the first and second coil sets, wherein each magnet comprises a first portion and a second portion being arranged adjacent to the first portion, and a polarity of the first portion facing the lens holder is different from a polarity of the second portion facing the lens holder;

wherein the first coil is adjacent to the first portion of the plurality of magnets and is not adjacent to the second portion of the plurality of magnets, and the first and second coil sets are arranged in a manner such that a first portion of the first and second coil sets is adjacent to the first portion of the plurality of magnets and a second portion of the first and second coil sets is adjacent to the second portion of the plurality of magnets, such that the first and second coil sets are configured to interact with a magnetic field of the first and second portions of the plurality of magnets to induce respective rotational motion of the lens holder.

2. The compact camera module of claim 1, wherein the first portion of the magnets has a size that is larger than that of the second portion of the magnets.

3. The compact camera module of claim 1, wherein the first axis is perpendicular to the second axis.

4. The compact camera module of claim 1, wherein the first coil and the first and second coil sets are connected to the lens holder, the first and second coil sets comprising four coils of which at least two coils are arranged at complementary positions on the lens holder to induce rotation of the lens holder about first axis perpendicular to the optical axis.

5. The compact camera module of claim 1, further comprising:
   a yoke connected to a base, wherein the lens holder is arranged within the yoke and base;
   a first spring arranged between the lens holder and the yoke; and
   a second spring arranged between the lens holder and the base.

6. The compact camera module of claim 5, wherein the electromagnetic actuator is arranged between the first and second springs.

7. A compact camera module comprising
a lens holder; and
an electromagnetic actuator connected to the lens holder, the electromagnetic actuator comprising:
   a first coil configured to induce movement of the lens holder substantially parallel with an optical axis of the lens holder;
   a first coil set configured to induce rotation of the lens holder about a first axis substantially perpendicular to the optical axis, wherein at least a portion of the first coil is disposed through a central portion of at least one coil of the first set; and
   a plurality of magnets disposed in proximity to the first coil and the first coil set, wherein each magnet comprises a first portion and a second portion being arranged adjacent to the first portion, and a polarity of the first portion facing the lens holder is different from a polarity of the second portion facing the lens holder;
   wherein the first coil is adjacent to the first portion of the plurality of magnets and is not adjacent to the second portion of the plurality of magnets, and the first coil set is arranged in a manner such that a first portion of the first coil set is adjacent to the first portion of the plurality of magnets and a second portion of the first coil set is adjacent to the second portion of the plurality of magnets, such that the first coil set is configured to interact with a magnetic field of the first and second portions of the plurality of magnets to induce rotational motion of the lens holder.

8. The compact camera module of claim 7, further comprising:
   a second coil set configured to induce rotation of the lens holder about a second axis substantially perpendicular to the optical axis.

9. The compact camera module of claim 8, wherein at least a portion of the first coil is disposed through a central portion of at least one coil of the second coil set.

* * * * *